United States Patent
Lin et al.

(10) Patent No.: US 12,459,594 B2
(45) Date of Patent: Nov. 4, 2025

(54) ASSIGNABLE PAIRING ORDER

(71) Applicant: SRAM, LLC, Chicago, IL (US)

(72) Inventors: Kristi Lin, Chicago, IL (US); Jaime Garnica, Skokie, IL (US); Alexander Kon-I Ho, Chicago, IL (US)

(73) Assignee: SRAM, LLC, Chicago, IL (US)

( * ) Notice: Subject to any disclaimer, the term of this patent is extended or adjusted under 35 U.S.C. 154(b) by 787 days.

(21) Appl. No.: 17/746,872

(22) Filed: May 17, 2022

(65) Prior Publication Data

US 2022/0371681 A1    Nov. 24, 2022

Related U.S. Application Data

(60) Provisional application No. 63/191,996, filed on May 22, 2021.

(51) Int. Cl.
*B62K 3/02*    (2006.01)
*B60R 16/027*    (2006.01)
(Continued)

(52) U.S. Cl.
CPC .............. *B62K 3/00* (2013.01); *B60R 16/027* (2013.01); *B62K 3/02* (2013.01); *B62M 9/126* (2013.01); *B62M 25/08* (2013.01); *H04L 67/12* (2013.01)

(58) Field of Classification Search
CPC ......... B62M 9/126; B62M 25/08; B62K 3/02; B62K 3/00; B60R 16/027; H04L 67/12
See application file for complete search history.

(56) References Cited

U.S. PATENT DOCUMENTS

| | | |
|---|---|---|
| 8,655,548 B2 | 2/2014 | Ichida |
| 9,229,712 B2 | 1/2016 | Takamoto |
| | (Continued) | |

FOREIGN PATENT DOCUMENTS

| | | |
|---|---|---|
| CN | 103723238 | 4/2014 |
| CN | 106256678 | 12/2016 |
| | (Continued) | |

OTHER PUBLICATIONS

Shimano; E-Tube Project for Mobile; Nov. 2020; Website: https://bike.shimano.com/content/dam/e-tube/assets/pdf/usermanual/mobile/UM-7J4MA-003-ENG.pdf; Last checked Jul. 3, 2023.

(Continued)

*Primary Examiner* — Tuan H Nguyen

(57) ABSTRACT

A system for a bicycle includes a plurality of controller devices. A type of controller device is the same for two or more controller devices of the plurality of controller devices. The system includes a pairing coordinator device configured to receive a respective device type identification from each controller device, and identify the type of controller device for the two or more controller devices based on the received device type identifications for the two or more controller devices. Based on the identification of the type of controller device, the pairing coordinator device is configured to update the device type identifications for the two or more controller devices, respectively, such that the updated device type identifications are different than each other. The pairing coordinator device is configured to pair only controller devices of the plurality of controller devices having different respective device type identifications with the pairing coordinator device.

19 Claims, 22 Drawing Sheets

(51) Int. Cl.
  *B62K 3/00* (2006.01)
  *B62M 9/126* (2010.01)
  *B62M 25/08* (2006.01)
  *H04L 67/12* (2022.01)

(56) References Cited

U.S. PATENT DOCUMENTS

| | | | |
|---|---|---|---|
| 9,491,788 | B1 | 11/2016 | Kasai |
| 10,370,062 | B2 * | 8/2019 | Bortolozzo ............... G06F 8/65 |
| 11,021,214 | B2 | 6/2021 | Ho |
| 2016/0152302 | A1 | 6/2016 | Nishino |
| 2016/0257269 | A1 * | 9/2016 | Watarai ................... B62J 43/13 |
| 2016/0257370 | A1 | 9/2016 | Hashimnoto |
| 2017/0008465 | A1 | 1/2017 | Kasai |
| 2018/0127058 | A1 | 5/2018 | Rodgers |
| 2020/0377167 | A1 | 12/2020 | Suzuki et al. |

FOREIGN PATENT DOCUMENTS

| | | |
|---|---|---|
| CN | 106364608 | 2/2017 |
| CN | 107010156 | 8/2017 |
| CN | 111483546 | 8/2020 |
| EP | 3691312 | 8/2020 |
| EP | 3694184 | 8/2020 |
| IT | PD20120349 | 5/2014 |
| TW | 201706335 | 1/2017 |
| TW | 202045403 | 12/2020 |

OTHER PUBLICATIONS

IEEE Standard; IEEE Standard for Information Technology—Telecommunications and Information Exchange Between Systems—Local and Metropolitan Area Networks—Specific Requirements.—Part 15.1: Wireless Medium Access Control (MAC) and Physical Layer (PHY) Specifications for Wireless Personal Area Networks (WPANs); Jan. 1, 2005; Picataway, NJ, USA.

Jimbo; Bluetooth Basics; Website: https://web.archive.org/web/20151018112633/https://learn.sparkfun.com/tutorials/bluetooth-basics/all; Last checked Jul. 3, 2023.

Contender Bicycles: "How To: Pair SRAM AXS to Smartphone App", Feb. 14, 2020 (Feb. 14, 2020), XP093279830, Retrieved from the Internet: URL:https://www.youtube.com/watch?v=Py8kNGpFd9g.

* cited by examiner

ASSIGNABLE PAIRING ORDER

PRIORITY

This application claims the benefit of U.S. Provisional Patent Application No. 63/191,996, filed May 22, 2021, which is hereby incorporated by reference in its entirety.

BACKGROUND

A bicycle includes various components that allow a user to control the operation of the bicycle. For instance, the bicycle may include a drivetrain where one or more gears can be selectably engaged with a drive chain to modify pedaling cadence and resistance. Correspondingly, the bicycle may include controller devices that receive input from the user to cause the drive chain to engage different gears.

SUMMARY

In one example, a system for a bicycle includes a plurality of controller devices. A type of controller device is the same for two or more controller devices of the plurality of controller devices. The system also includes a pairing coordinator device configured to receive a respective device type identification from each controller device of the plurality of controller devices, and identify the type of controller device for the two or more controller devices based on the received device type identifications for the two or more controller devices, respectively. Based on the identification of the type of controller device, the pairing coordinator device is further configured to update the device type identifications for the two or more controller devices, respectively, such that the updated device type identifications for the two or more controller devices are different than each other. The pairing coordinator device is further configured to pair only controller devices of the plurality of controller devices having different respective device type identifications with the pairing coordinator device, such that a wireless network that enables communications between the pairing coordinator device and the controller devices is established.

In one example, the system further includes one or more movable components. Each movable component of the one or more movable components is configured to enact at least one respective operation on the bicycle. The pairing coordinator device is further configured to receive a respective device type identification from each moveable component of the one or more movable components, and pair the one or more movable components to the wireless network, such that the wireless network enables communications between the pairing coordinator device, the controller devices, and the one or more movable components.

In one example, the pairing coordinator device is further configured to generate a roster and transmit the roster to the one or more movable components via the wireless network. The roster identifies the controller devices and the one or more movable components paired to the wireless network.

In one example, each controller device of the plurality of controller devices includes at least one respective input element. The paired controller devices are configured to transmit signals indicating input received by the input elements of the paired controller devices, respectively. The one or more movable components are configured to identify, based on the roster received from the pairing coordinator device, operations to be executed, respectively, in response to the signals received from the paired controller devices.

In one example, the paired one or more movable components are configured to determine which of the one or more movable components are to execute which of the operations responsive to the signals. The determination of which of the one or more movable components are to execute which of the operations responsive to the signals includes process of a default set of assignments.

In one example, a movable component of the paired one or more movable components is further configured to receive, via the wireless network, the signals from the paired controller devices, identify one of the received signals as being from an assigned controller device of the paired controller devices according to the default set of assignments, and enact the respective operation in response to the one received signal from the assigned controller device.

In one example, the pairing coordinator device includes a communication interface configured to receive a modified set of assignments. The modified set of assignments causes at least one of the operations to be enacted by a corresponding movable component of the one or more movable components in response to one or more of the signals from a different one of the controller devices compared to the default set of assignments. The pairing coordinator device is configured to transmit, via the wireless network, the modified set of assignments to the one or more movable components. The one or more movable components are configured to replace the default set of assignments with the modified set of assignments, and determine how the one or more movable devices enact the operations responsive to the signals according to the modified set of assignments.

In one example, the pairing coordinator device is a movable component of the one or more movable components.

In one example, the one or more movable components include a front derailleur configured to modify a position of a bicycle chain of the bicycle relative to a first set of gears of the bicycle, a rear derailleur configured to modify a position of the bicycle chain relative to a second set of gears of the bicycle, a seat post assembly configured to modify a position of a seat of the bicycle relative to a frame of the bicycle, or any combination thereof.

In one example, the device type identifications are updated based on a temporal order in which the respective device type identifications are received by the pairing coordinator from the two or more controller devices.

In one example, the identification of the type of controller device for the two or more controller devices includes comparison of the received respective device type identifications for the two or more controller devices to a predetermined device type identification or a predetermined device type identification range, respectively, and identification of the type of controller device when the received respective device type identifications for the two or more controller devices are the same as the predetermined device type identification or within the predetermined device type identification range.

In one example, the received respective device type identifications have numerical values, the predetermined device type identification has a numerical value, and the predetermined device type identification range represents a range of numerical values.

In one example, the type of controller device is a first type of controller device. The plurality of controller devices include two or more second controller devices. The two or more second controller devices are a second type of controller device. The second type of controller device is different than the first type of controller device.

In one example, the first type of controller device is one of an assignable single button controller and an assignable two button controller, and the second type of controller device is the other of the assignable single button controller and the assignable two button controller.

In one example, the pairing coordinator device is further configured to receive a respective device type identification from each second controller device of the plurality of second controller devices. The pairing coordinator device is further configured to identify the second type of controller device for the plurality of second controller devices based on the device type identifications received from the plurality of second controller devices. Based on the identification of the second type of controller device, the pairing coordinator device is further configured to update the device type identifications for the plurality of second controller devices, respectively, such that the updated device type identifications for the plurality of second controller devices are different than each other. The pairing coordinator device is further configured to pair only second controller devices having different respective device type identifications, respectively, to the wireless network, such that the wireless network enables communications between the pairing coordinator device, the first controller devices, and the second controller devices.

In one example, the update of the device type identifications for the two or more controller devices includes storage of the updated device type identifications at the two or more controller devices, respectively.

In one example, a pairing coordinator device for a bicycle includes a communication interface configured to communicate with a plurality of controller devices. A type of controller device is the same for two or more controller devices of the plurality of controller devices. The communication interface is configured to receive a respective device type identification from each controller device of the plurality of controller device. The pairing coordinator device further includes one or more processors in communication with the communication interface. The one or more processors are configured to establish, via the communication interface, a pairing session that allows the plurality of controller devices to be paired to a wireless network. The establishment of the pairing session includes identification of the type of controller device for the two or more controller devices based on the received device type identifications for the two or more controller devices, respectively. Based on the identification of the type of controller device, the establishment of the pairing session further includes update of the device type identifications for the two or more controller devices, respectively, such that the updated device type identifications for the two or more controller devices are different than each other. The establishment of the pairing session further includes pair of only controller devices of the plurality of controller devices having different respective device type identifications with the pairing coordinator device, such that the wireless network, which enables communications between at least the pairing coordinator device and the controller devices, is established.

In one example, the device type identifications are updated based on a temporal order in which the respective device type identifications are received by the pairing coordinator from the two or more controller devices.

In one example, the pairing session is a first pairing session, the wireless network is a first wireless network, the temporal order is a first temporal order, and the updated device type identifications are first updated device type identifications. The one or more processors are further configured to establish, via the communication interface, a second pairing session that allows the plurality of controller devices to be paired to a second wireless network. The establishment of the second pairing session is after the establishment of the first pairing session. The establishment of the second pairing session includes receipt, via the communication interface, of a respective device type identification from each controller device of the plurality of controller devices in a second temporal order. The second temporal order is different than the first temporal order. The establishment of the second pairing session further includes identification of the type of controller device for the two or more controller devices based on the received device type identifications for the two or more controller devices, respectively, and based on the identification of the type of controller device, update of the first updated device type identifications for the two or more controller devices, respectively, such that second updated device type identifications are generated for the two or more controller devices, respectively. The second updated device type identifications are different than the first updated device type identifications. The establishment of the second pairing session further includes pair of only controller devices of the plurality of controller devices having different respective device type identifications with the pairing coordinator device, such that the second wireless network, which enables communications between at least the pairing coordinator device and the controller devices, is established.

In one example, a controller device for a bicycle includes an input element configured to receive input from a user of the bicycle. The controller device further includes a communication interface in communication with the input element. The communication interface is configured to communicate wirelessly with a pairing coordinator device of the bicycle and one or more movable components of the bicycle. The controller device further includes a memory in communication with the communication interface. The memory is configured to store an assignable device type identification. The assignable device type identification identifies the controller device as an assignable controller device. The controller device further includes one or more processors in communication with the memory and the communication interface, the one or more processors are configured, after initiation of a pairing session by the pairing coordinator device, to transmit, via the communication interface, the assignable device type identification to the pairing coordinator device. The one or more processors are further configured to receive, via the communication interface, a new device type identification from the pairing coordinator device. The new device type identification is different than the assignable device type identification. The one or more processors are further configured to store, by the memory, the new device type identification, and pair the controller device to a wireless network established by the pairing coordinator device based on the new device type identification. The wireless network enables communications between the controller device, the pairing coordinator device, and the one or more movable components. The one or more processors are configured to generate a signal in response to the received input from the user of the bicycle at the input element, and transmit, via the communication interface and the wireless network, the generated signal to the one or more movable components.

Figure 1A:
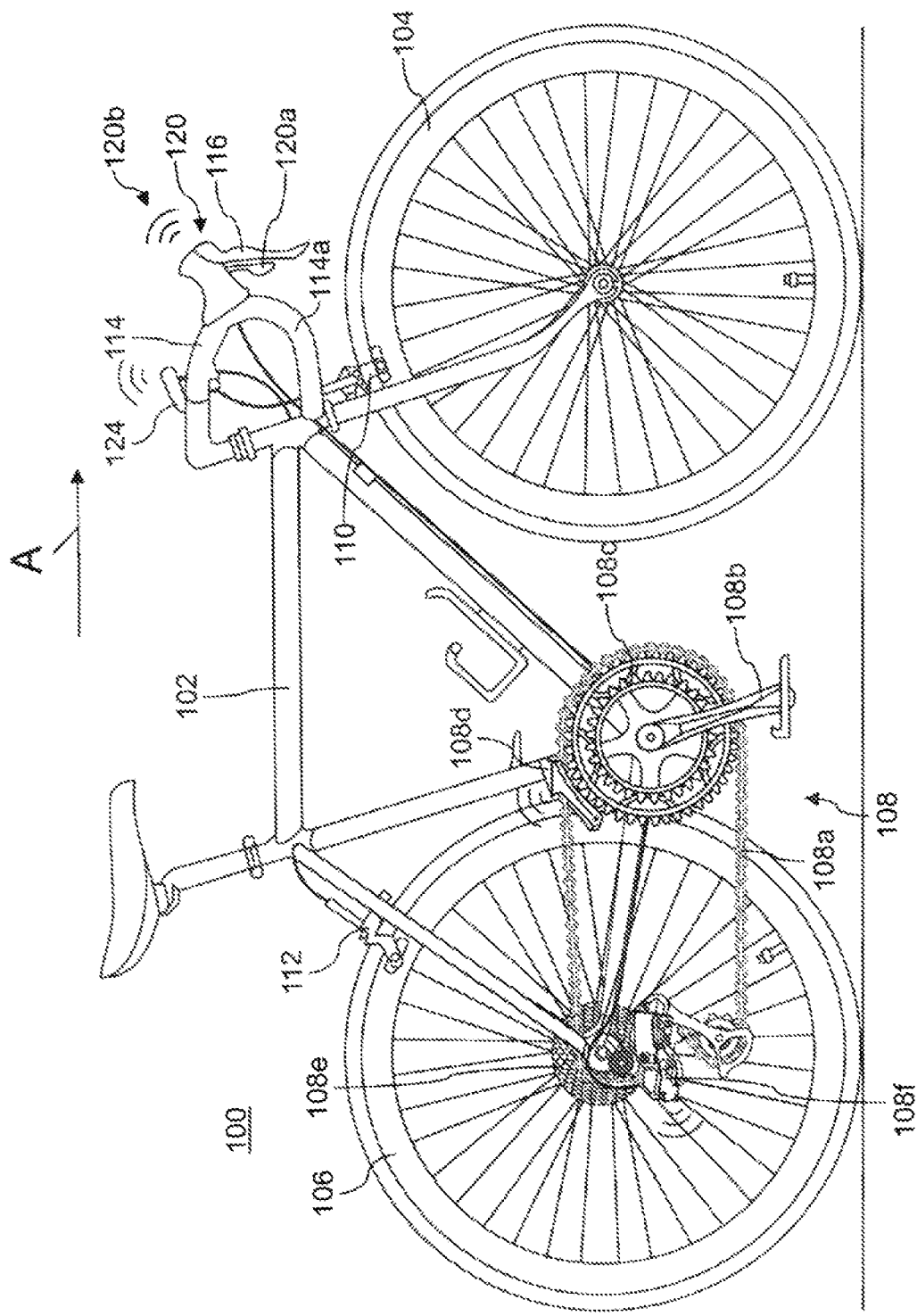
FIG. 1A illustrates a right-side view of an example road bicycle that can implement aspects of the present disclosure.

Other aspects and advantages of the embodiments disclosed herein will become apparent upon consideration of the following detailed description, wherein similar or identical structures have similar reference numerals. Various embodiments of the invention will be described herein with reference to the drawings. It will be understood that the drawings and the description set out herein are provided for illustration only and do not limit the invention as defined by the claims appended hereto and any and all their equivalents.

DETAILED DESCRIPTION

According to aspects of the present disclosure, embodiments provide systems, devices, and methods for controlling components on a bicycle. The embodiments employ a plurality of controller devices that receive input from a user to control operation-enacting devices on the bicycle. Operation-enacting devices generally include at least one movable component configured to modify an operative state of the bicycle. The controller devices and the operation-enacting devices are paired to a wireless network. When a particular controller device receives an input from the user, the particular controller device sends a corresponding signal to the operation-enacting devices paired to the network. Embodiments employ a set of assignments to determine which, if any, of the operation-enacting devices responds to the signal from the particular controller device. The set of assignments may be modified by the user according to preferences of the user. In other words, the embodiments provide a reconfigurable control system for the components of the bicycle.

In the prior art, only one of each type of bicycle component may be paired into a wireless network (e.g., a system) of the bicycle at a given time. Each component has a unique device type, and if a pairing with multiple components of a same type is attempted, only one of the components will be functional.

The development of assignable controllers, however, provides that all components on the bicycle may not be unique. Multiple assignable controllers may be added to a bicycle according to a preference of a rider. For example, two identical shifters may be used for a left shifter and a right shifter, respectively, instead of a unique left shifter and a unique right shifter. Accordingly, a number of identical components may be paired into the system.

The present embodiments provide that each assignable controller may be differentiated from the other assignable controllers. Each assignable controller may be differentiated from the other assignable controllers based on, for example, an order in which the assignable controllers are paired into the system. Each assignable controller has a different default reaction and is able to be configured individually.

According to the present embodiments, each of the assignable controllers may have a dynamic device type assigned to the respective assignable controller upon pairing. Each of the assignable controllers is programmed with an assignable device type at or after manufacture. When the respective assignable controller is paired to a pairing coordinator device, the pairing coordinator device inspects the programmed device type to determine whether the programmed device type is an assignable device type. If the programmed device type is an assignable device type, the pairing coordinator device programs the respective assignable controller with a new device type. The new device type is assigned (e.g., in increasing numerical order) based on the assignable device type (e.g., a single button controller or a two button controller) and the order in which the assignable controllers are paired into the system.

After all of the assignable controllers have been paired into the system and a pairing session is closed, the pairing coordinator device uses a roster to designate default reactions. The default reactions are mapped to the assignable device types. For example, a first of the assignable controllers, which is paired first into the system, has a default reaction of an outboard shift of a rear derailleur of the bicycle, and a second of the assignable controllers, which is paired into the system immediately after the first assignable controller, has a default reaction of an inboard shift of the rear derailleur.

All controllers of the bicycle that are paired into the system, including all of the assignable controllers, may be reconfigured using, for example, a mobile device application. When the user opens the mobile device application, the user may see representations of multiple controllers that communicate within the system of the bicycle, including representations of the assignable controllers and representations of non-assignable (e.g., standard) controllers paired into the system.

Each representation of a standard controller within the system has a unique appearance (e.g., name and/or artwork), such that the user may easily identify the component (e.g., rear derailleur, front derailleur) being configured within, for example, the mobile device application. The representations of the assignable controllers within the mobile device application, however, may not clearly indicate which of the assignable controllers corresponds to which of the representations within the mobile device application.

For example, if the user builds a bicycle with two standard controllers and two assignable controllers, when the user opens the mobile device application, the user may see representations of four devices. While the two standard controllers are identifiable by corresponding unique representations, the user may not be able to identify which assignable controller corresponds to which representation or icon within the mobile device application.

The present embodiments provide a method in which correspondence between assignable controllers on the bicycle and representations within the mobile device application may be determined. The user may interact with an input device (e.g., a button) on the respective assignable controller, and the corresponding representation within the mobile device application is highlighted within the mobile device application in response to the user interaction with the respective assignable controller.

When the user interacts with the input device of the respective assignable controller (e.g., presses the button of the respective assignable controller), the respective assignable controller sends a device type and a button mask of the respective assignable controller to all receivers of the system. For example, the respective assignable controller sends a button message including the device type and the button mask of the respective assignable controller to a bridge device of the bicycle in response to the button press. The bridge device caches the device type and the button mask of the respective assignable controller. The bridge device transmits a notification to the mobile device application. That notification identifies that a new controller has sent a button message. In response to the notification, the mobile device application queries the bridge device for information about the new controller (e.g., the respective assignable controller). In response to the query, the bridge device sends the cached device type and the button mask corresponding to the respective assignable controller to the mobile device application. The mobile device application highlights (e.g., lights up) the representation displayed within the mobile device application based on the device type and the button mask received from the bridge device.

The disclosed bicycle component control differentiates identical components on a bicycle (e.g., shifters) and allows for the assignment of default reactions. This assignment of default reactions may make user interaction with a mobile device application unnecessary during bicycle system setup. Further, the user is able to easily identify identical components within the mobile device application, for example, by interacting with buttons on the components; the user may then configure controls, check battery status, and perform maintenance without having to guess which controller corresponds to which representation within the mobile device application.

These and other objects, features, and advantages of the disclosed bicycle component control will become apparent to those having ordinary skill in the art upon reading this disclosure. Throughout the drawing figures, where like reference numbers are used, the like reference numbers represent the same or substantially similar parts among the various disclosed examples. Also, specific examples are disclosed and described herein that utilize specific combinations of the disclosed aspects, features, and components of the disclosure. However, it is possible that each disclosed aspect, feature, and/or component of the disclosure may, in other examples not disclosed or described herein, be used independent of or in different combinations with other of the aspects, features, and components of the disclosure.

FIG. 1A illustrates a right side view of an example road bicycle 100. The bicycle 100 includes a frame 102, a front wheel 104, a rear wheel 106, and a drivetrain 108. The front wheel 104 and the rear wheel 106 are rotatably coupled to the frame 102. The bicycle includes a front brake 110 for braking the front wheel 104 and a rear brake 112 for braking the rear wheel 106. To allow a user to steer the bicycle 100, the bicycle 100 includes a handlebar assembly 114 attached to the frame 102.

Figure 1B:
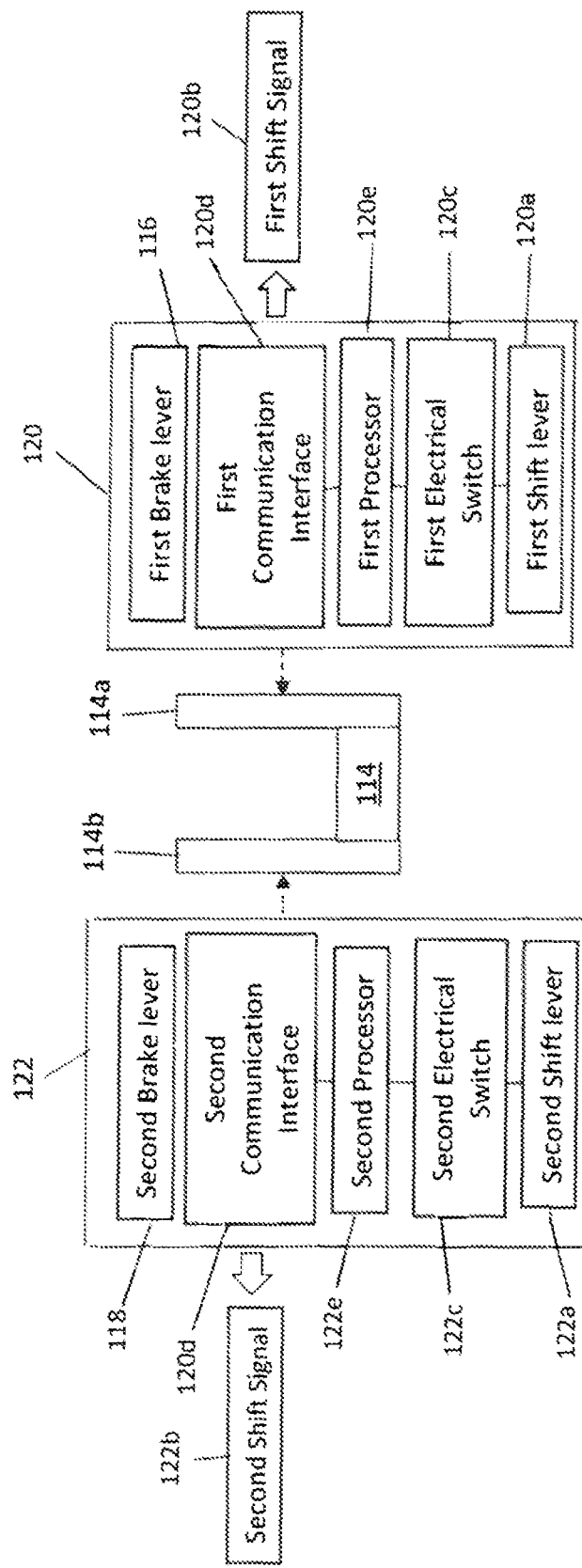
FIG. 1B illustrates a schematic diagram of a handlebar assembly of the example road bicycle shown in FIG. 1A and other components coupled to the handlebar assembly.

FIG. 1B illustrates a schematic diagram depicting the handlebar assembly 114 and other components coupled to the handlebar assembly 114. As shown in FIGS. 1A and/or 1B, the handlebar assembly 114 includes a right drop bar 114a and a left drop bar 114b to accommodate the right hand and the left hand of the user, respectively. Additionally, the bicycle 100 includes a first or right controller device 120 coupled to the right drop bar 114a. The first controller device 120 includes a first or right brake lever 116 to allow the user to operate the rear brake 112. Correspondingly, the bicycle 100 includes a second or left controller device 122 coupled to the left drop bar 114b. The second controller device 122 includes a second or left brake lever 118 to allow the user to operate the front brake 110. The first control device 120 and the second control device 122 may be identical control devices (e.g., interchangeable, assignable control devices).

Figure 1C:
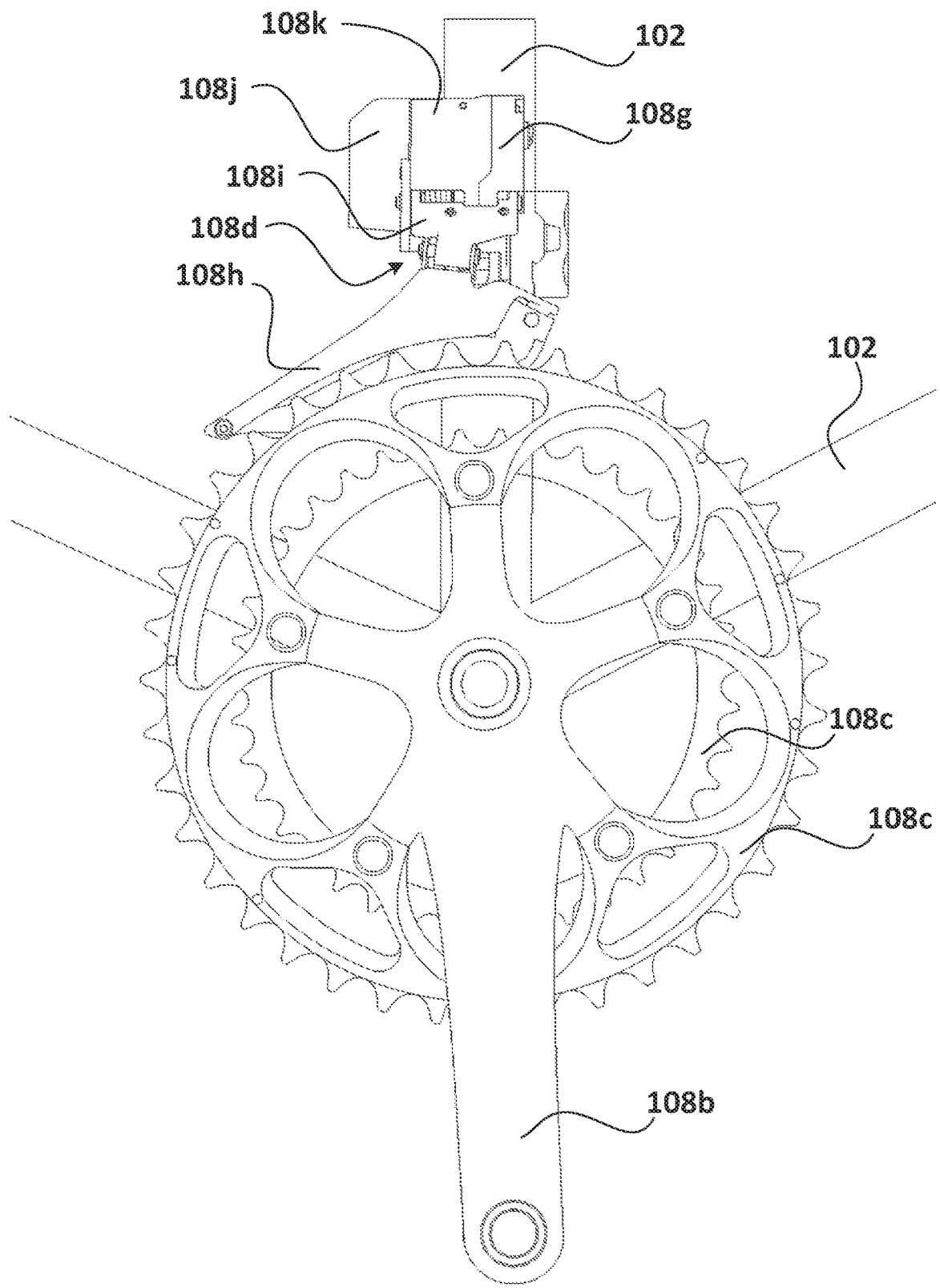
FIG. 1C illustrates a side view of a front derailleur of the example road bicycle shown in FIG. 1A.
Figure 1D:
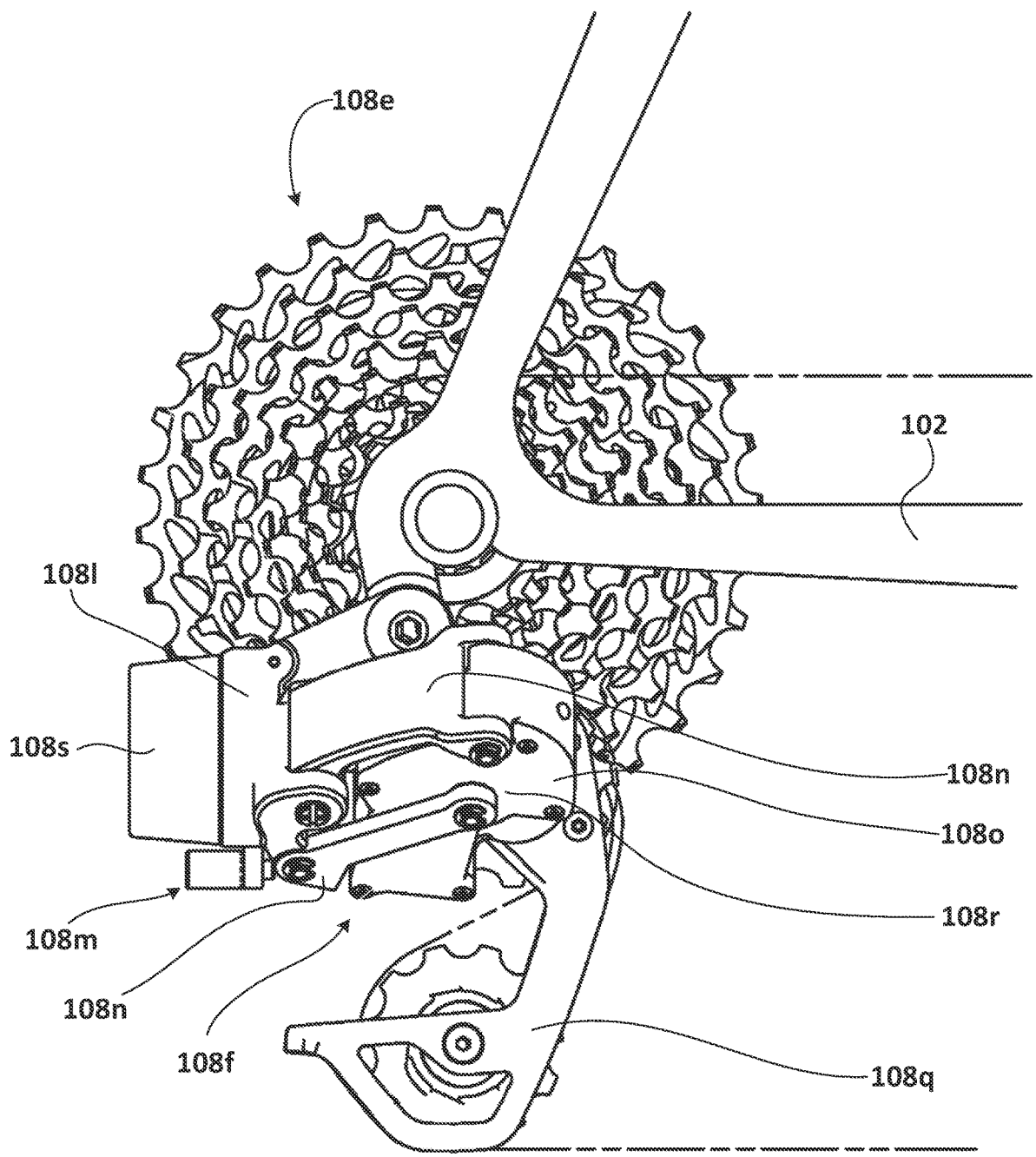
FIG. 1D illustrates a side view of a rear derailleur of the example road bicycle shown in FIG. 1A.

As shown in FIGS. 1A, 1C and 1D, the drivetrain 108 includes a drive chain 108a, a front crank 108b, front chainrings 108c, a front gear changer such as an electromechanical front derailleur 108d, rear sprockets 108e, and a rear gear changer such as an electromechanical rear derailleur 108f. The front chainrings 108c are coupled to the front crank 108b. The diameters and number of teeth on the front sprockets 108c may differ from each other. The rear sprockets 108e are coaxially mounted to the rear wheel 106. The diameters and the numbers of teeth on the rear sprockets 108e may gradually decrease from left to right (e.g., relative to the frame 102 such that a smallest of the sprockets 108 is outermost relative to the frame 102). Alternatively, the diameters and the numbers of teeth on the rear sprockets 108e may gradually decrease from right to left (e.g., relative to the frame 102). The chain 108a engages a selected chainring 108c and a selected sprocket 108e.

To drive the bicycle 100, the user can pedal to rotate the front crank 108b relative to the frame 102. Rotation of the front crank 108b causes the selected chainring 108c to rotate and the chain 108a to move through the drivetrain 108. Movement of the chain 108a causes corresponding rotation of the selected sprocket 108e and thus the rear wheel 106. Rotation of the rear wheel 106 against the ground may propel the bicycle 100 in a forward direction. The front and/or forward orientation and movement of the bicycle 100 is indicated by the direction of arrow "A." Further, other terms relating to direction may be used herein. For example, the terms "inboard" and "outboard," and "left" and "right" may be used. The terms "right" and "left," and "inboard" and "outboard" describe a position between parts or items and a vertical plane substantially bisecting the bicycle or a direction toward or away from the vertical plane substantially bisecting the bicycle 100. Moreover, terms such as "front" and "rear" refer to bicycle mechanisms conventionally mounted to the bicycle and with the bicycle oriented in the forward direction.

The selected chainring 108c and the selected sprocket 108e, in combination, determine a gear ratio for driving the bicycle 100. Operation of the front derailleur 108d allows the user to change the selected chainring 108c engaged by the chain 108a. For example, the front derailleur 108d may be actuated to shift the chain 108a left or right from one chainring 108c to the other. The front derailleur 108d is shown as a wireless electrically-actuated front derailleur mounted to the frame 102. The front derailleur 108d may include a base member 108g mounted to the frame 102 of the bicycle 100 and a chain guide assembly 108h or cage movably connected to the base member 108g by a front linkage 108i in the form of, for example, a parallelogram. A front power supply 108j (e.g., a removable battery) may be mounted on the front derailleur 108d. The front power supply 108j may supply power to a front motor unit 108k. The front motor unit 108k is configured to supply torque to the components of the front derailleur 108d to move the chain guide assembly 108h relative to the front base member 108g such that the front derailleur 108d may shift the chain 108a between the front sprockets 108c.

Meanwhile, operation of the rear derailleur 108f allows the user to change the selected sprocket 108e engaged by the chain 108a. For example, the rear derailleur 108f may be actuated to shift the chain 108a left or right from one sprocket 108e to another. The rear derailleur 108f is shown as a wireless electrically-actuated rear derailleur mounted to the frame 102. The rear derailleur may include a base member 108l (e.g., a b-knuckle) that is mounted to the frame 102 of the bicycle 100. A linkage 108m may include two links 108n that are pivotally connected to the base member 108l. A movable member 108o (e.g., a p-knuckle) may be connected to the linkage 108m. A chain guide assembly 108q or cage may be configured to engage and maintain tension in the chain 108a and may be pivotally connected to a part of the movable member 108o.

A motor unit 108r and rear power supply 108s (e.g., a removable battery) are disposed on the rear derailleur 108f. The rear power supply 108s supplies power to the motor unit 108r. In this embodiment, the motor unit 108r is disposed in the movable member 108o. Alternatively, the motor unit 108r may be disposed in one of the links 108n or in the base member 108l. The motor unit 108r may include a motor and a gear transmission. The motor unit 108r may be coupled with the linkage 108m to laterally move the cage 108q and thus shift the chain 108a among the rear sprockets 108e.

Figure 1E:
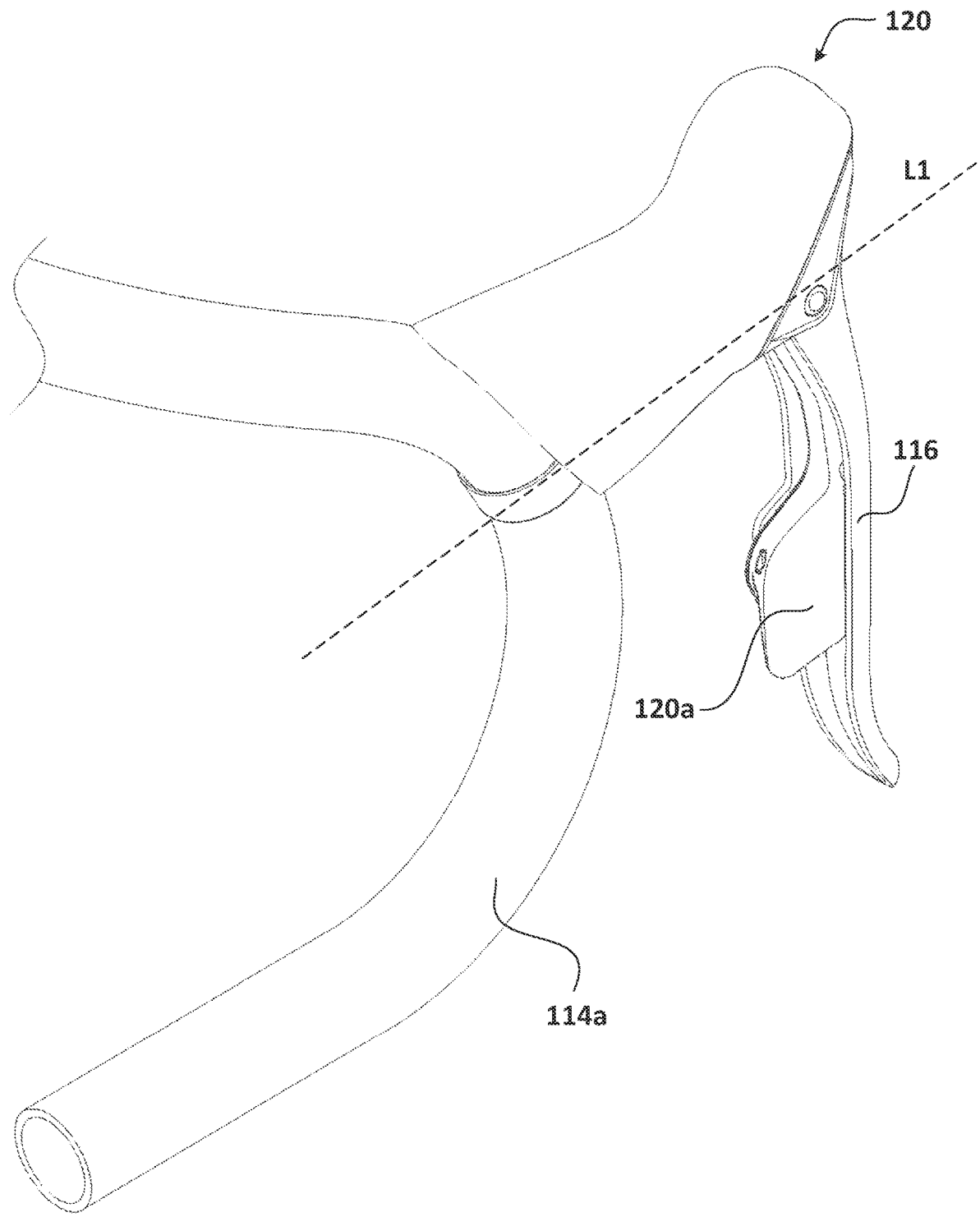
FIG. 1E illustrates a side view of a first controller device of the example road bicycle shown in FIG. 1A coupled to a right drop bar.

Referring to FIGS. 1A, 1B, and 1E, to allow the user to operate the front derailleur 108d or the rear derailleur 108f, the first controller device 120 and the second controller device 122 include a first electrical switch 120c and a second electrical switch 122c that are actuated by a first input element and a second input element (e.g., a first shift lever 120a and a second shift lever 122a), respectively. The first shift lever 120a is configured to receive a right input from the right hand of the user and actuate the first electrical switch 120c. The second shift lever 122a configured to receive a left input from the left hand of the user and actuate the second electrical switch 122c. The first shift lever 120a may be positioned behind the first brake lever 116, while the second shift lever 122a may be positioned behind the second brake lever 118.

To provide the right input to the first shift lever 120a, the user may manually apply pressure on the right side of the first shift lever 120a. In response, the first shift lever 120a may pivot about a first shift lever axis L1 from an initial rest position to a shift actuation position. The first shift lever 120a may be biased with a spring or the like so that when the manual pressure is no longer applied by the user, the first shift lever 120a returns to the initial rest position. Similarly, to provide the left input to the second shift lever 122a, the user may manually apply pressure on the left side of the second shift lever 122a. In response, the second shift lever 122a may pivot about a second shift lever axis L2 (not shown) from an initial rest position to a shift actuation position. The second shift lever 122a may be biased with a spring or the like so that when the manual pressure is no longer applied by the user, the second shift lever 122a returns to the left starting position.

The first controller device 120 and the second controller device 122 include a first controller processor 120e and a second controller processor 122e, respectively. The first controller processor 120e and the second controller processor 122e electronically process the manual input received by the first shift lever 120a and the second shift lever 122a, respectively. For example, the right input triggers a first controller communication interface 120d to wirelessly send a first shift signal 120b, and left input triggers a second controller communication interface 122d to wirelessly send a second shift signal 122b. Correspondingly, the front derailleur 108d and the rear derailleur 108f include communication interfaces and processors that are configured to receive and electronically process the first shift signal 120b and/or the second shift signal 122b to determine a designated response.

In a first scenario, the user provides the right input via the first shift lever 120a but does not provide the left input via the second shift lever 122a. In response, the first controller device 120 sends the first shift signal 120b, while the left controller device 122 sends no signal. When the rear derailleur 108f receives the first shift signal 120b with no second shift signal 122b, the rear derailleur 108f shifts the chain 108a to engage the next smaller sprocket 108e to the right or performs a downshift. Meanwhile, when the front derailleur 108d receives the first shift signal 120b with no second shift signal 122b, the front derailleur 108d remains idle.

In a second scenario, the user provides the left input via the second shift lever 122a but does not provide the right input via the right shift lever 120a. In response, the second controller device 122 sends the second shift signal 122b, while the first controller device 120 sends no signal. When the rear derailleur 108f receives the second shift signal 122b with no first shift signal 120b, the rear derailleur 108f shifts the chain 108a to engage the next larger sprocket 108e to the left or performs a upshift. Meanwhile, when the front derailleur 108d receives the second shift signal 122b with no second shift signal 120b, the front derailleur 108d remains idle.

In a third scenario, the user simultaneously provides the right input via the first shift lever 120a and the left input via the second shift lever 122a. In response, the first controller device 120 sends the first shift signal 120b, and the second controller device 122 sends the second shift signal 122b. When the rear derailleur 108f receives the first shift signal 120b and the second shift signal 122b simultaneously or within a certain time period, the rear derailleur 108f remains idle. Meanwhile, when the front derailleur 108d receives the first shift signal 120b and the second shift signal 122b simultaneously or within a certain time period, the front derailleur 108d shifts the chain 108a left or right to engage a different chainring 108c. In some cases, the drivetrain 108 includes only two chainrings 108c, so the simultaneous right input and left input causes the chain 108a to alternate between the two chainrings 108c. Other configurations may be provided.

In some embodiments, the user may manually apply pressure to the first shift lever 120a and/or the second shift lever 122a for varying amounts of time. For example, without applying pressure to the second shift lever 122a, the user may apply continuous pressure to keep the first shift lever 120a in the left final position for a period that exceeds a threshold amount of time (e.g., approximately one second). In response, the first controller device 120 sends the first shift signal 120b for a corresponding amount of time (e.g., until the user releases the pressure on the first shift lever 120a). When the rear derailleur 108f receives the first shift signal 120b, the rear derailleur 108f determines that the first shift signal 120b exceeds a threshold amount of time. In response, rather than merely shifting the chain 108a to engage the next sprocket 108e to the right, the rear derailleur 108f shifts the chain 108a repeatedly over multiple sprockets 108e to the right until the user releases the pressure on the first shift lever 120a and the first shift signal 120b ceases, or until the chain 108a reaches the right-most sprocket 108e. Alternatively, to shift the chain 108a repeatedly over multiple sprockets 108e to the left, the user may apply continuous pressure to the left shift lever 122a for a period that exceeds the threshold amount of time.

As shown in FIGS. 1A-B, the first controller device 120 and the second controller device 122 employ the first shift lever 120a and the second shift lever 122a as respective input elements to generate corresponding wireless shift signals 120b, 122b to actuate the front derailleur 108d and the rear derailleur 108f. Alternative embodiments, however, may include controller devices with different configurations to control a front derailleur and/or a rear derailleur. For instance, a bicycle may include aerobars with pushbuttons instead of drop bars with shift levers, where the pushbuttons act as input elements that may be pressed by the user to generate wireless signals that may be received and processed by the front derailleur and the rear derailleur. Also, while some controller devices may be coupled to handlebar assemblies, other controller devices may be coupled to other areas of a bicycle, such as locations throughout a frame of the bicycle. Further, other types of controller devices may be provided. For example, a unified shifter device may be employed, where the user may press one or more pushbuttons on a mounted box to send signals that control the front derailleur and/or the rear derailleur. Alternatively, a pedal sensor may be employed to receive input from the user via the pedaling action of the user, and the front derailleur and/or the rear derailleur may respond to a signal from the pedal sensor (e.g., select gears to maintain a desired cadence or pedal resistance).

Figure 2A:
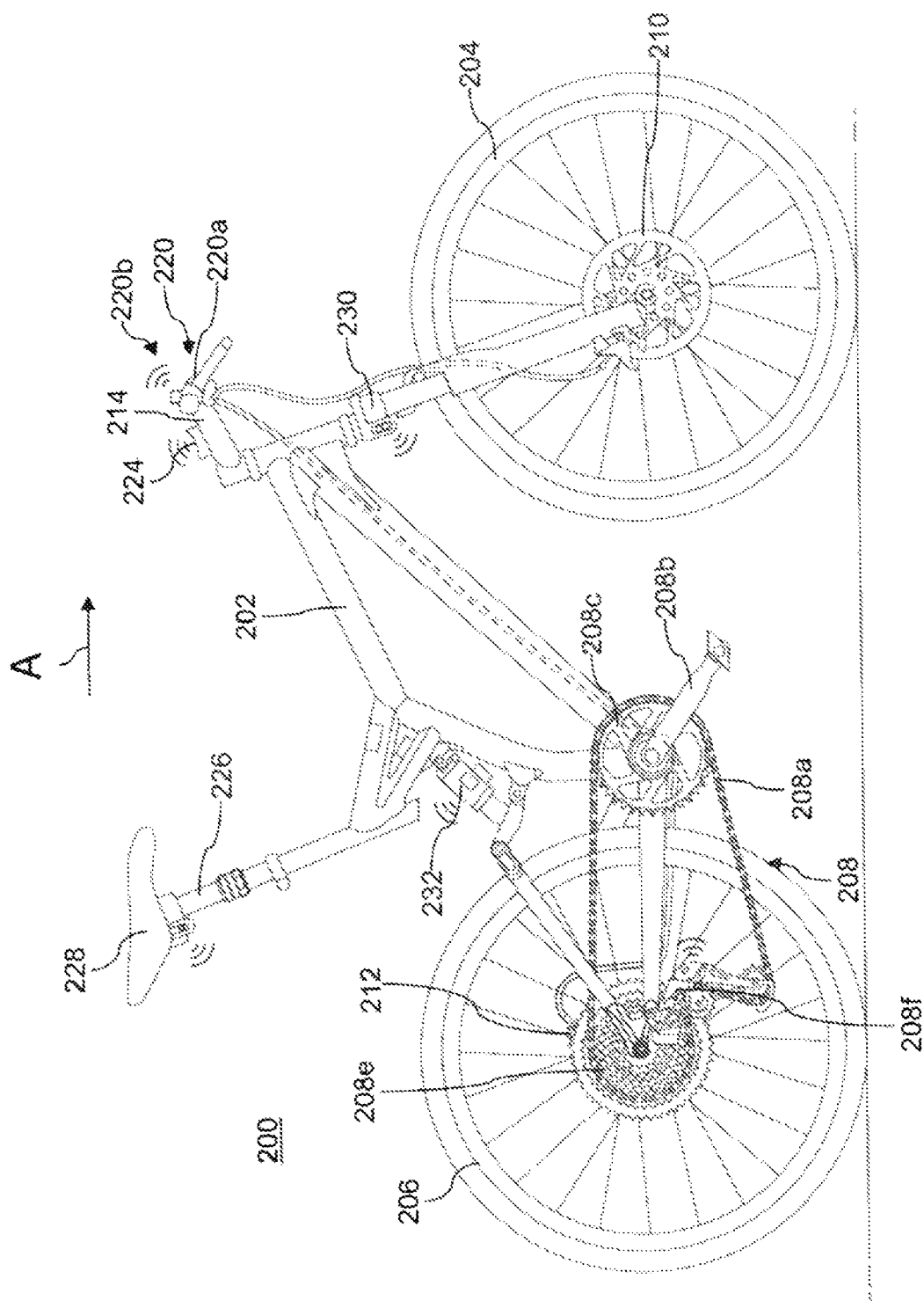
FIG. 2A illustrates a right-side view of an example mountain bicycle that can implement aspects of the present disclosure.

While the example bicycle 100 shown in FIGS. 1A-B is a road bicycle, aspects of the present disclosure may be implemented with bicycles of any type. For example, FIG. 2A illustrates a right side view of an example mountain bicycle 200. The bicycle 200 includes a frame 202, a front wheel 204, a rear wheel 206, a drivetrain 208, front disk brakes 210, and rear disk brakes 212. The drivetrain 208 includes a chain 208a, a front crank 208b, a front chainring 208c, rear sprockets 208e, and a rear derailleur 208f, which operate in a manner similar to the corresponding components of the drivetrain 108 above.

In contrast to the bicycle 100, the bicycle 200 includes other operating-enacting devices such as a seat post assembly 226 (e.g., a height-adjustable seat post assembly), a front suspension system 230, and a rear suspension system 232. In FIGS. 2A and 2C, the seat post assembly 226 is shown as a wireless, electrically-actuated seat post assembly 226 that allows a position of a seat 228 to be dynamically adjusted. For example, the adjustable seat post assembly 226 may include an operable valve (not shown) that allows the seat 228 to be dropped to a lower height during a ride to change a position of the user relative to the frame 202 and achieve better handling. The seat post assembly 226 includes a first or lower tube 226a and a second or upper tube 226b (e.g., two tubes). The two tubes 226a, 226b are movable relative to each other to establish a height of the seat 228 relative to the frame 202. A head 226c is fixed to a top of the second tube 226b. A seat post motor unit 226d is mounted to the head 226c, and a power supply 226e (e.g., a removable battery) is attached to the motor unit 226d. The motor unit 226d may include a motor and a gear transmission. The power supply 226e may supply power to the seat post motor unit 226d. The seat post motor unit 226d is configured to supply torque to the components of the seat post assembly 226 to open and close the operable valve.

The front suspension system 230 is shown as a wireless, electrically-actuated front suspension system that allows suspension characteristics at the front wheel 204 to be dynamically adjusted. Further, the rear suspension system 232 is shown as a wireless, electrically-actuated rear suspension system that allows suspension characteristics at the rear wheel 206 to be dynamically adjusted. The front suspension system 230 and the rear suspension system 232 may further include power supplies such as batteries that supply power to a front suspension motor unit and a rear suspension motor unit (e.g., motor units), respectively. The motor units may be configured to supply torque to components of the front suspension system 230 and the rear suspension system 232, respectively, to open and close one or more valves to change various suspension characteristics.

Figure 2B:
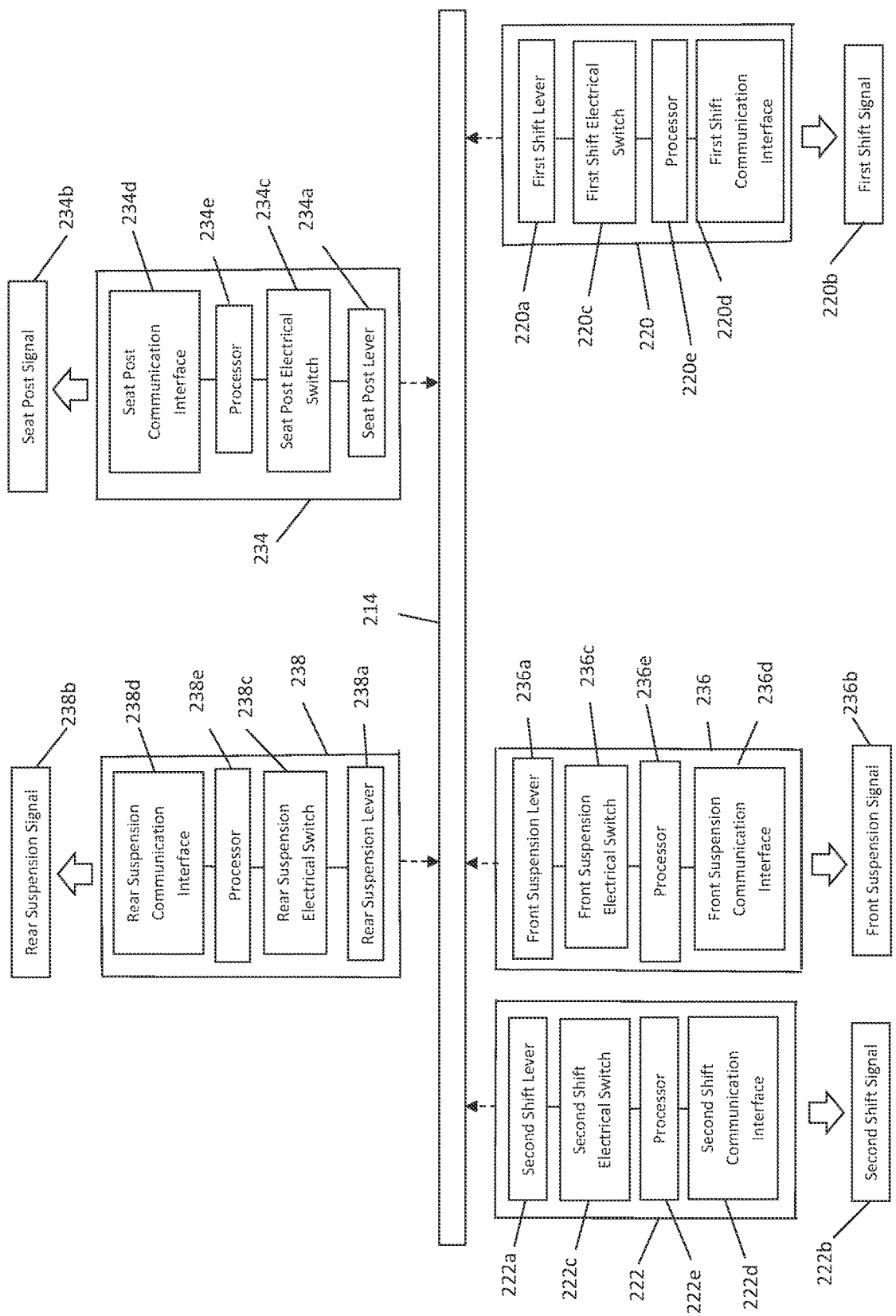
FIG. 2B illustrates a schematic diagram of a handlebar assembly of the example mountain bicycle shown in FIG. 2A and other components coupled to the handlebar assembly.
Figure 2C:
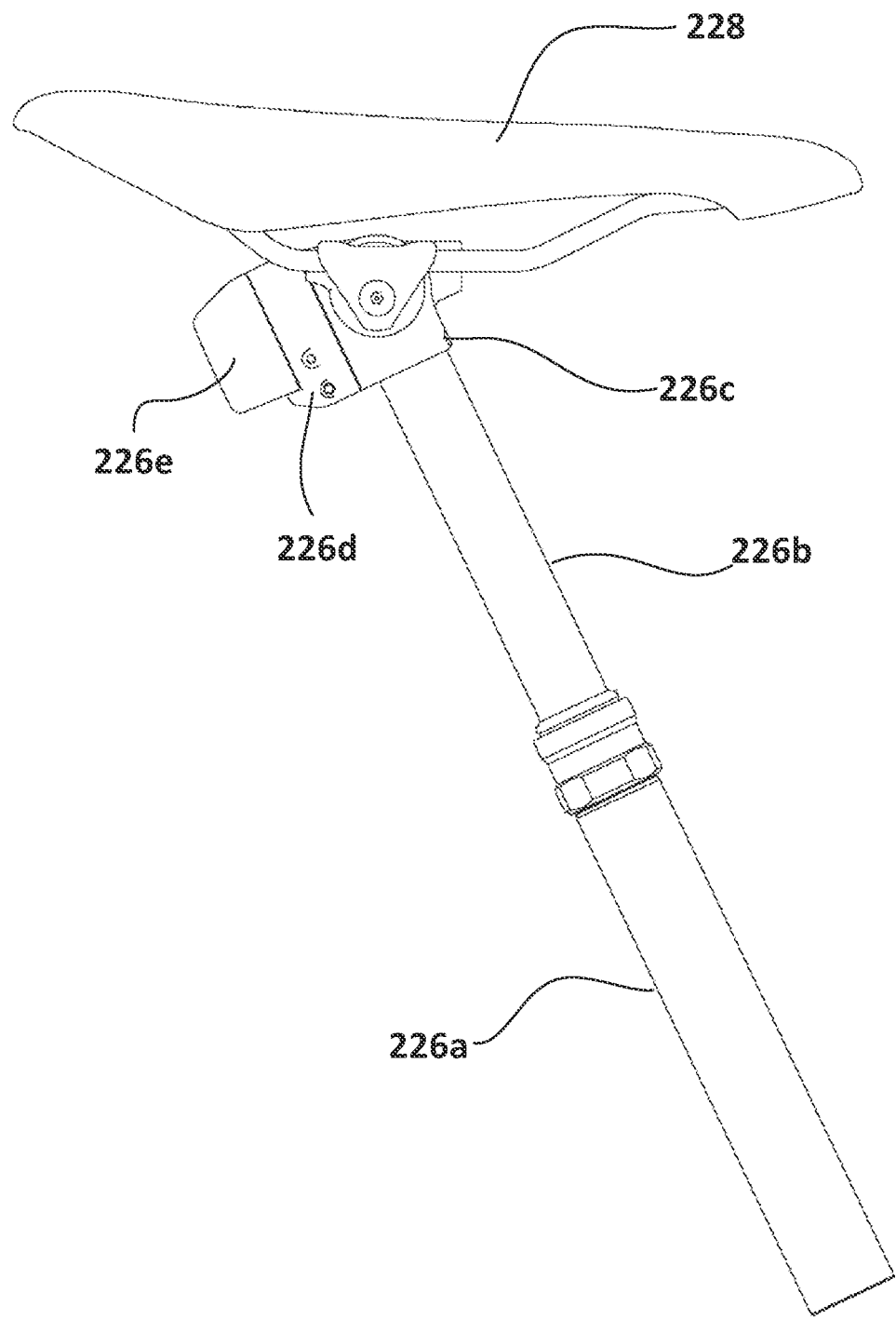
FIG. 2C illustrates a side view of a seat post assembly, with a saddle installed thereon, of the example mountain bicycle shown in FIG. 2A.

Referring to FIGS. 2A and 2B, the bicycle 200 includes a first or right controller device 220 and a second or left controller device 222. In one embodiment, the first controller device 220 and the second controller device 222 are identical controller devices (e.g., assignable controllers). The first controller device 220 and the second controller device 222 include a first electrical switch 220c and a second electrical switch 222c that are actuated by a first input element and a second input element (e.g., a first shift lever 220a and a second shift lever 222a), respectively. The handlebar assembly 214 includes a flat bar or a riser bar instead of drop bars. As such, the first controller device 220 is coupled to a right side of the flat or riser bar, and the second controller device 222 is coupled to a left side of the flat or riser bar. Additionally, the bicycle 200 may include a seat post controller device 234, a front suspension controller device 236, and a rear suspension controller device 238 coupled to the handlebar assembly 214.

The user may operate the first shift lever 220*a* and/or the second shift lever 222*a* as described above to generate a first shift signal 220*b* and/or a second shift signal 222*b*, respectively. Similar to the bicycle 100, the first shift signal 220*b* and/or the second shift signal 222*b* may be employed to control the rear derailleur 208*f*. To allow the user to adjust the height of the seat post assembly 226, the seat post controller device 234 includes a seat post electrical switch 234*c* that is actuated by a seat post input element 234*c* such as a lever or button.

To allow the user to adjust the characteristics of the front suspension system 230 and the rear suspension system 232, the front suspension controller device 236 and the rear suspension controller device 238 include a front suspension electrical switch 236*c* and a rear suspension electrical switch 238*c* that are actuated by a suspension input element 236*a* and a suspension input element 238*a* (e.g., levers or buttons), respectively. Alternatively, the adjustable seat post assembly 226, the adjustable front suspension system 230, and the adjustable rear suspension system 232 may also be configured to receive the first shift signal 220*b* and/or the second shift signal 222*b*, so that these devices may also be controlled by operation of the first shift lever 220*a* and/or the second shift lever 222*a*.

The seat post controller device 234, the front suspension controller device 236, and the rear suspension controller device 238 include processors 234*e*, 236*e*, and 238*e*, respectively. The processors 234*e*, 236*e*, and 238*e* electronically process the manual input received by the seat post input element 234*a*, the front suspension input element 236*a*, and the rear suspension input element 238*a*, respectively. The manual input received by the seat post input element 234*a* triggers a seat post controller communication interface 234*d* to wirelessly send a seat post signal 234*b*. The manual input received by the front suspension input element 236*a* triggers a front suspension controller communication interface 236*d* to wirelessly send a front suspension signal 236*b*, and the manual input received by the rear suspension input element 238*a* triggers a rear suspension controller communication interface 238*d* to wirelessly send a rear suspension signal 238*b*. Correspondingly, the seat post assembly 226 includes a communication interface and a processor that are configured to receive and electrically process the seat post signal 234*b* to determine a designated response. The front suspension system 230 includes a communication interface and processors that are configured to receive and electronically process the front suspension signals to determine a designated response, and the rear suspension system 232 includes a communication interface and processors that are configured to receive and electronically process the rear suspension signals to determine a designated response.

FIGS. 1A-1E and 2A-2C illustrate how various controller devices may be employed to wirelessly communicate control signals to different combinations of operation-enacting devices. The signals from the controller devices may be communicated wirelessly using any technique, protocol, or standard. For example, Institute of Electrical and Electronics Engineers ("IEEE") 802.11 standards, IEEE 802.15.1 or BLUETOOTH® standards, and/or ANT™ or ANT+™ standards may be used. In some embodiments, however, control signals may be communicated wirelessly over a proprietary protocol, such as one that operates on top of the physical layer of the IEEE 802.15.4 wireless protocol. The use of a proprietary protocol may enhance security by limiting access to the wireless network to devices specifically configured to communicate under the proprietary protocol. This may thereby reduce the likelihood of unwanted interference from other wireless devices. The bicycle 100 includes a network coordinator device 124 (e.g., a pairing coordinator device) that may be configured to establish and manage the wireless communications between the various devices as described in further detail below. Similarly, the bicycle 200 includes a network coordinator device 224. Alternatively, one of the controller devices or the operation-enacting devices on the bicycle may be the network coordinator (e.g., a rear derailleur).

Figure 3:
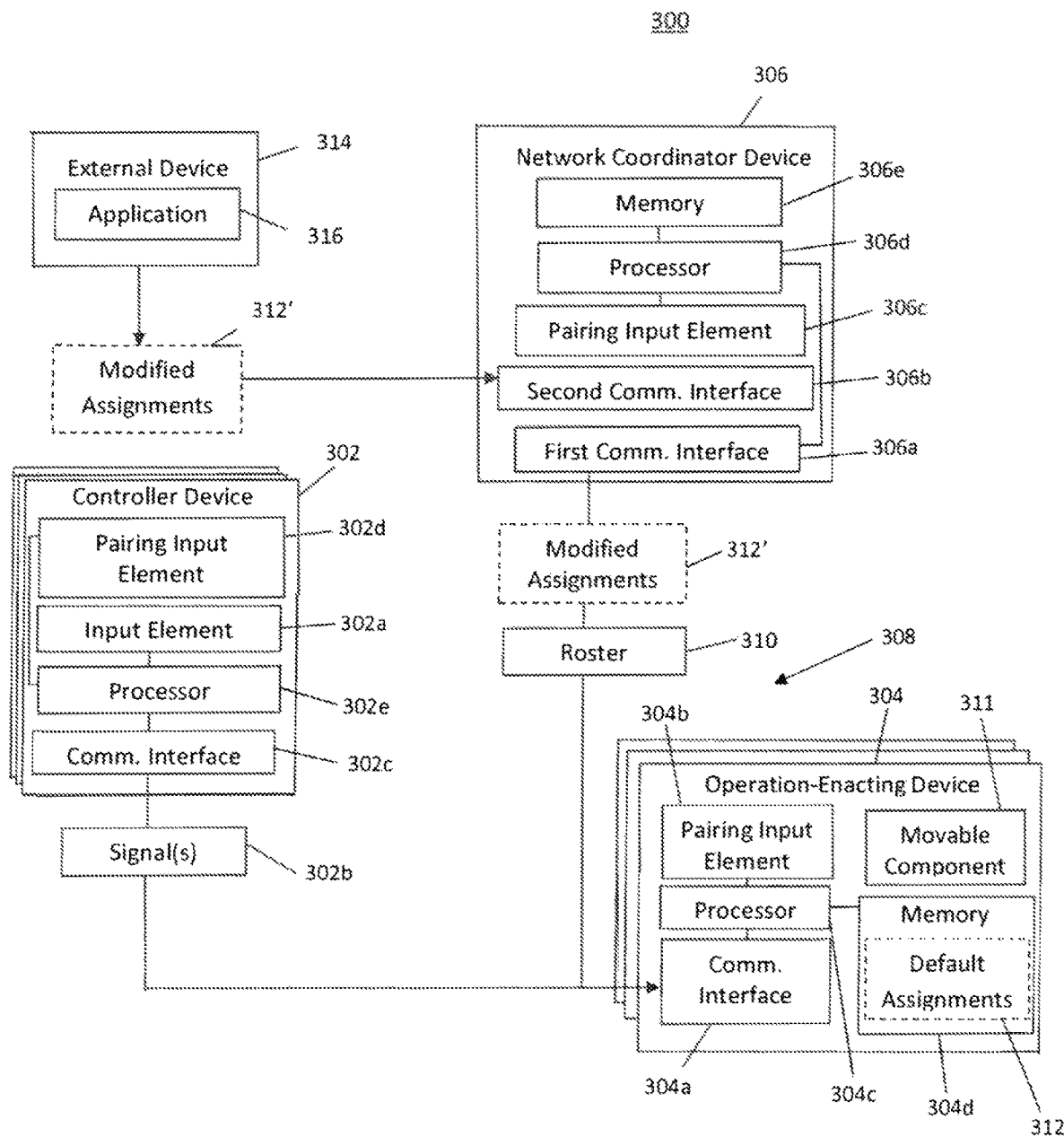
FIG. 3 illustrates an example system for controlling different combinations of operation-enacting devices on a bicycle, according to aspects of the present disclosure.

FIG. 3 illustrates an example system 300 for controlling different combinations of operation-enacting devices (e.g., movable components) on a bicycle. The system 300 includes a plurality of controller devices 302. Each controller device 302 includes at least one respective input element 302*a* configured to receive input from a user. For example, as described above, the controller devices 302 may include a first controller device coupled to a right side of a handlebar assembly and a second controller device coupled to a left side of the handlebar assembly, where respective shifter levers act as input elements 302*a*. In general, input elements 302*a* may include any variety of shifter, pushbutton, clicker, switch, other toggled device, sensor (e.g., peddling sensor, etc.), or the like. A single controller device 302 may also include more than one input element 302*a*, (e.g., two shifter levers, a plurality of pushbuttons, etc.). In one embodiment, the first controller device and the second controller device are a same type of controller device (e.g., same or identical shifters).

The system 300 also includes a plurality of operation-enacting devices 304 (e.g., movable components). Each operation-enacting device 304 of the plurality of operation-enacting devices 304 is configured to enact at least one respective operation on the bicycle. For example, the operation-enacting devices 304 may include a front derailleur, a rear derailleur, a height-adjustable seat post assembly, a front suspension system, and/or a rear suspension system as described above. Each operation-enacting device 304 may include at least one or be a movable component 311 configured to modify an operative state of the bicycle. In some cases, an operation-enacting device 304 may act on more than one component of the bicycle in a single operation. In other cases, a single operation may include more than one act on one or more components of the bicycle. In yet other cases, the operation may include a physical action and a wireless action, where the wireless action sends wireless signals to cause further action by other cooperative device (s).

The system 300 also includes a network coordinator device 306 (e.g., a pairing coordinator device). The network coordinator device 306 includes a first communication interface 306*a* configured to communicate wirelessly with the plurality of controller devices 302 and the plurality of operation-enacting devices 304. Using the first communication interface 306*a*, the network coordinator device 306 may establish a wireless network 308 that enables communications between the network coordinator device 306, the controller devices 302, and the operation-enacting devices 304. Correspondingly, each controller device 302 of the plurality of controller devices 302 includes a communication interface 302*c*, and each operation-enacting device 304 of the plurality of operation-enacting devices 304 includes a communication interface 304*a* for communicating with other devices (e.g., receiving and transmitting data/signals) on the wireless network 308. Although the network coordinator device 306 may appear in FIG. 3 as a separate device, the features of a network coordinator device 306 in alternative embodiments may be provided by one or more of the other controller devices 302 and/or operation-enacting devices 304 such as a rear derailleur.

Figure 5:
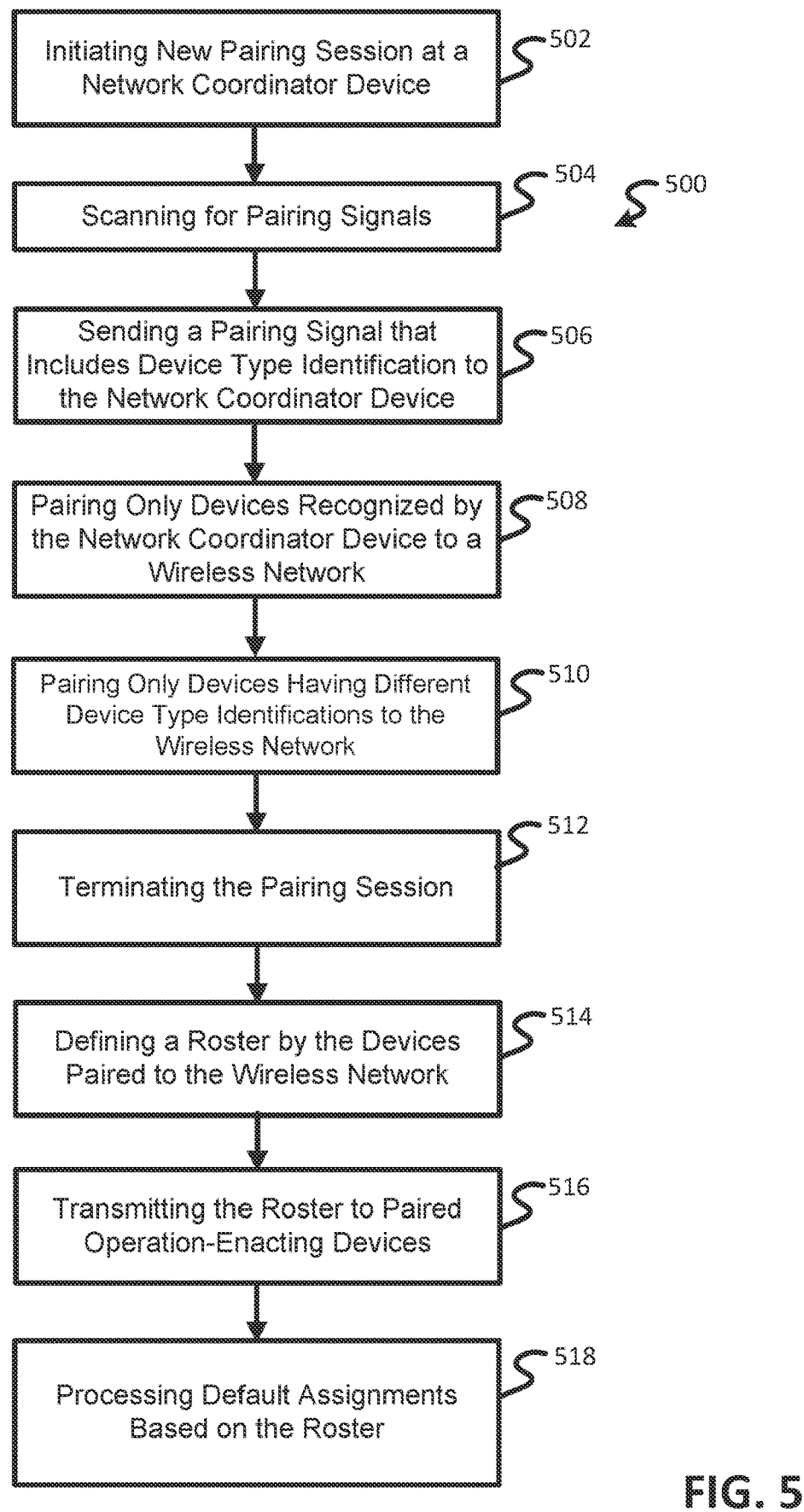
FIG. 5 illustrates a flow chart of an embodiment for a method of establishing a wireless network between controller devices and operation-enacting devices of a bicycle.

FIG. 5 illustrates a method 500 for establishing a wireless network between a network coordinator device, controller devices and operation-enacting devices and establishing a set of default assignments that determine how the operating-enacting devices enact the operations in response to the signals received from the controller devices. The acts of the method presented below are intended to be illustrative. In some embodiment, the method may be accomplished with one or more additional acts not described, and/or without one or more of the acts discussed. Additionally, the order in which the acts of the method are illustrated in FIG. 5 and described below is not intended to be limiting.

In some embodiments, the method may be implemented in one or more processing device (e.g., digital processor, an analog processor, a digital circuit configured to process information, an analog-circuit configured to process information, a state machine, and/or other mechanisms for electronically processing information). The one or more processing devices include one or more devices executing some or all the acts of the method in response to instructions stored electronically on an electronic storage medium. The one or more processing devices are configured, through hardware, firmware, and/or software, for execution of one or more of the acts of the method.

A network coordinator device (e.g., the network coordinator device 306) is configured to initiate a new pairing session to pair controller devices (the controller devices 302) and operation-enacting devices (e.g., the operation-enacting devices 304) to a wireless network (e.g., the wireless network 308). In act 502, the user selects the network coordinator device from among the controller devices and the operation-enacting devices by operating a pairing input element (e.g., the pairing input element 306c) such as, for example, a pushbutton, switch, or the like that prompts the selected network coordinator device to initiate a new pairing session. While in the pairing mode, in act 504, the network coordinator device scans for pairing signals from other devices. When the new pairing session is active, the user may selectively pair a controller device or an operation-enacting device to the wireless network by operating a corresponding pairing input element (e.g., a pairing input element 302d or 304b) such as a pushbutton, switch, or the like on the given device to be placed into pairing mode. While in pairing mode, in act 506, the selected device transmits a pairing signal to the network coordinator device in response to operation of the pairing input element of the selected device. In act 508, the pairing signal allows the network coordinator device to recognize the given device and permit the given device to join the wireless network. If a proprietary network protocol is employed for the wireless network, only devices configured to communicate according to the proprietary network protocol may be recognized by the network coordinator device and paired.

In some embodiments, in act 506, the pairing signal from a given device provides a respective device type identification, and the network coordinator device determines whether the given device is an assignable device based on the respective device type identification. If the network coordinator device determines the given device is an assignable device based on the respective device type identification, the network coordinator device assigns a next available assigned device type to the given device, and in act 510, the pairing signal allows the network coordinator device to permit the given device to join the wireless network. The assignment of assigned device types is discussed below further with reference to FIGS. 8-11.

If the network coordinator device determines the given device is not an assignable device (e.g., determines the given device is a standard device), the network coordinator device only pairs devices having different respective device type identifications in act 510. For example, the pairing signal may identify a given device to be a rear derailleur. By limiting the pairings to devices with different respective device type identifications, the system (e.g., the system 300) will not include more than one rear derailleur. As such, an unknown device cannot imitate another device type that has already been selected for pairing.

In act 512, the user may manually end the pairing session (e.g., by operating the pairing input element 306c on the network coordinator device 306). Alternatively, the network coordinator device may automatically end the pairing session after a set time period has elapsed.

In act 514, a roster (e.g., a roster 310) is defined by the controller devices and the operation-enacting devices that have been paired to the wireless network at the end of the pairing session. To enhance the integrity of the system, no other devices may be paired to the wireless network 38 after the pairing session has ended. By fixing the roster, the system only includes the devices (e.g., devices 302 and/or 304) selected by the user. This blocks unauthorized devices from joining the wireless network and maliciously or accidentally interfering with the operation of the devices actually selected by the user.

In act 516, when the pairing session ends, the network coordinator device is configured to transmit, to the operation-enacting devices, the roster identifying the controller devices and the operation-enacting devices paired to the wireless network. In act 518, the operation-enacting devices are configured to determine, based on the roster received from the network coordinator device, how to enact operations in response to signals (e.g., the signals 302b) received from the controller devices.

If desired, a new pairing session may be initiated with the network coordinator device to reset the roster and to pair a different set of devices (e.g., devices 302 and/or 304). At the end of the new pairing session, this different set of devices defines a new roster. The new pairing session unpairs and resets all devices that may have been added to the wireless network in a previous pairing session. In general, paired devices cannot be removed from the roster, and new devices cannot be added to the roster until a new pairing session is initiated. A device paired to the wireless network may be paired into another wireless network (e.g., on another bicycle system), but that device cannot rejoin the prior wireless network (e.g., the wireless network 308) because the prior wireless network is reset when paired to the other wireless network.

Referring to FIG. 3, the controller devices 302 are configured to transmit, to the operation-enacting devices 304, signals 302b indicating input received by the input elements 302a of the controller devices 302. For example, a first controller device 302 (e.g., the first controller device 120) and a second controller device 302 (e.g., the second controller device 122) may wirelessly transmit a first shift signal (e.g., the first shift signal 120b) and a second shift signal (e.g., the second shift signal 120a) as described above to indicate input received by a first input element (e.g., the first shift lever 120a) and a second input element (e.g., the second shift lever 122a), respectively.

The operation-enacting devices 304 are configured to process a default set of assignments 312 based on the roster 310 to determine how the operation-enacting devices 304 enact the operations responsive to the signals 302b. The default set of assignments 312 may be transmitted to each operation-enacting device 304 by the network coordinator device 306 and/or stored locally on each operation-enacting device 304.

For example, after a pairing session is completed, the roster 310 may include a first controller device with a first shift lever (e.g., a right shift lever), a second controller device with a second shift lever (e.g., left shift lever), a front derailleur, and a rear derailleur. The default set of assignments 312 controlling the operation of the operation-enacting devices 304 is determined according to the particular set of devices in the roster 310. For example, the default set of assignments 312 may provide that with the example roster 310 above: (i) the rear derailleur shifts the chain to a sprocket inboard relative to the frame of the bicycle in response to signals from the second controller device (with no signals from the first controller device); (ii) the rear derailleur shifts the chain to a sprocket outboard relative to the frame in response to signals from the first controller device (with no signals from the second controller device); and (iii) the front derailleur shifts the chain to an alternate chainring in response to simultaneous signals from the first controller device and the second controller device. If the roster 310 includes a different set of devices, the default set of assignments 312 may be different. For example, if the roster 310 includes a height-adjustable seat post assembly and does not include a front derailleur, the seat post assembly lowers the seat in response to the simultaneous signals from the right and left controller devices.

A paired device is considered to remain in the wireless network 308, and the roster 310 does not change even if the paired device becomes inactive or unavailable (e.g., loses power or is re-paired to another wireless network).

Each operation enacted by the corresponding operation-enacting device 304 occurs only in response to the signals 302b from a single assigned controller device 302 or a single assigned combination of controller devices 302, as described below. For example, an operation may involve shifting the chain to a sprocket inboard with the rear derailleur, and such operation only occurs in response to signals from the second controller device. This reduces the likelihood of an unwanted response by an operation-enacting device 304 to a signal from an unknown device.

When a combination of more than one controller device is employed to produce simultaneous signals (e.g., simultaneous signals from the first controller device and the second controller device), the combination of controller devices may be considered to be a single virtual controller device. Thus, an operation may involve the front derailleur shifting the chain to an alternate chainring, and such operation may only occur in response to signals from the single virtual controller device defined by the combination of the first controller device and the second controller device. Alternatively, a single virtual device may be provided by simultaneous signals from two or more inputs on a single device (e.g., simultaneous presses of pushbuttons on a single unified shifter device).

Figure 6:
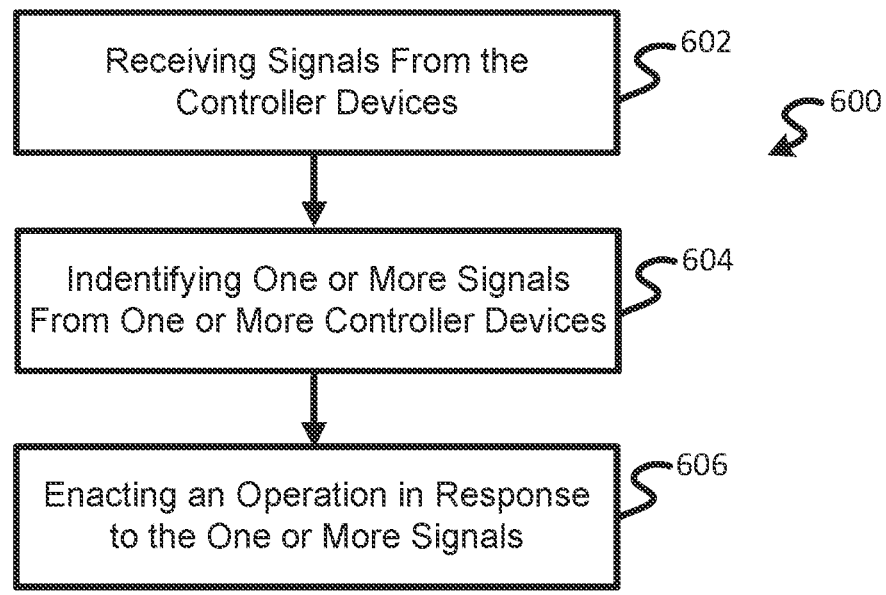
FIG. 6 illustrates a flow chart of an embodiment for a method of controlling operation-enacting devices of a bicycle.

FIG. 6 illustrates a method 600 for controlling operation-enacting devices (e.g., the operation-enacting devices 304). Once the roster is established and the default set of assignments is determined according to the roster, in act 602, each operation-enacting device may receive, via the wireless network, the signals from the controller devices. In act 604, each operation-enacting device may identify the one or more signals from an assigned controller device or from an assigned combination of controller devices. In act 606, each operation-enacting device enacts the operation in response to the one or more signals from the assigned controller device or assigned combination of controller devices.

Although the default set of assignments 312 may provide an effective approach for determining how the operation-enacting devices 304 should respond to the signals 302b from the controller devices 302, the user may prefer to use a modified set of assignments 312'. For example, the modified set of assignments 312' may provide that with the example roster 310 above: (i) the rear derailleur shifts the chain to the inboard sprocket in response to signals from the first controller device that do not exceed a threshold amount of time (without signals from the second controller device); (ii) the rear derailleur shifts the chain to the outboard sprocket in response to signals from the first controller device that meet or exceed the threshold amount of time (without signals from the second controller device); and (iii) the front derailleur shifts the chain to an alternate chainring in response to signals from the second controller device.

Accordingly, aspects of the present disclosure allow the assignments between the controller devices 302 and the operation-enacting devices 304 to be modified to reconfigure the system 300. As shown in FIG. 3, the network coordinator device 306 may include a second wired and/or wireless communication interface 306b configured to receive the modified set of assignments 312', where the modified set of assignments 312' causes at least one operation enacted by an operation-enacting device 304 to occur in response to the signals 302b from a different controller device 302. The second communication interface 306b may employ a different protocol than the first communication interface 306a (e.g., when the first communication interface 306a employs a proprietary protocol).

Figure 7:
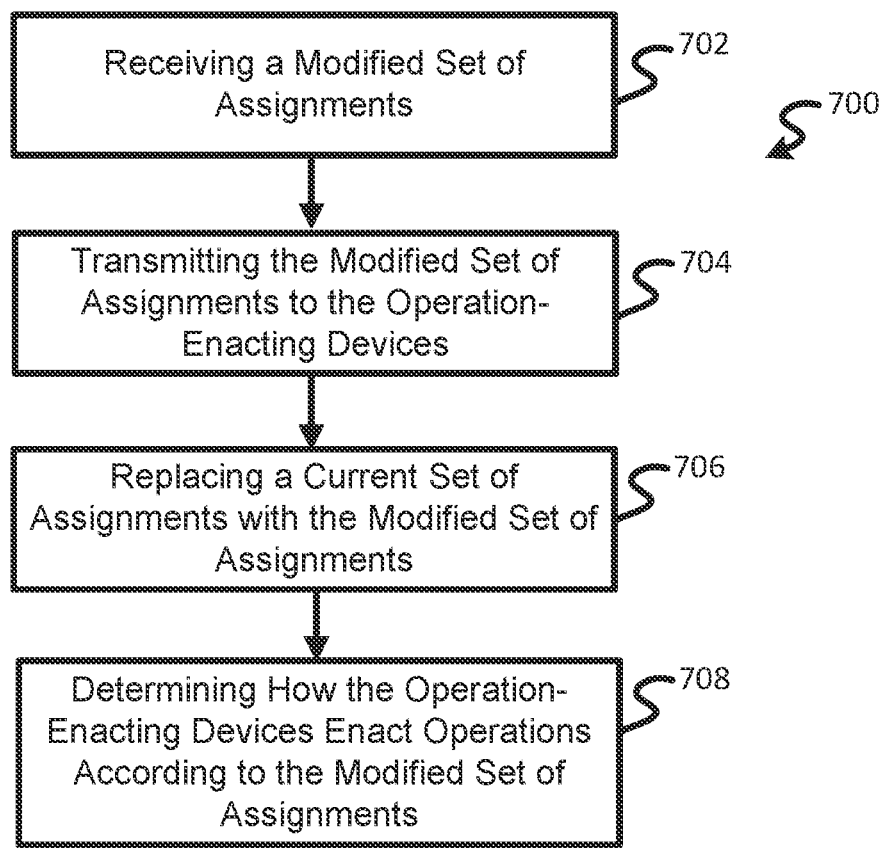
FIG. 7 illustrates a flow chart of an embodiment for a method of modifying the default or current set of assignments of a bicycle.

FIG. 7 illustrates a method of modifying the default or current set of assignments. In act 702, the network coordinator device (e.g., the network coordinator device 306) receives a modified set of assignments (e.g., modified set of assignments 312' in FIG. 3). In act 704, the network coordinator device transmits, via the wireless network (e.g., the wireless network 308), the modified set of assignments to the operation-enacting devices (e.g., operation-enacting devices 304). Correspondingly, in act 706, the operation-enacting devices replace the default or current set of assignments (e.g., the default set of assignments 312) with the modified set of assignments. In act 708, the operation-enacting devices determine how the operation-enacting devices are to enact operations in response to the signals (e.g., the signals 302b) according to the modified set of assignments. If desired, the user may modify the set of assignments again in a similar manner.

According to some embodiments, referring to FIG. 3, the second communication interface 306b is configured to wirelessly couple the network coordinator device 306 to an external computing device 314, such as a mobile device (e.g., a smart phone), a computing tablet, a laptop, a personal computer, or the like. The external computing device 314 may include an application 316, such as a mobile application or other computer software. The application 316 is configured to receive the modified set of assignments 312' from a user and to transmit the modified set of assignments 312' to the network coordinator device 306.

Figure 4A:
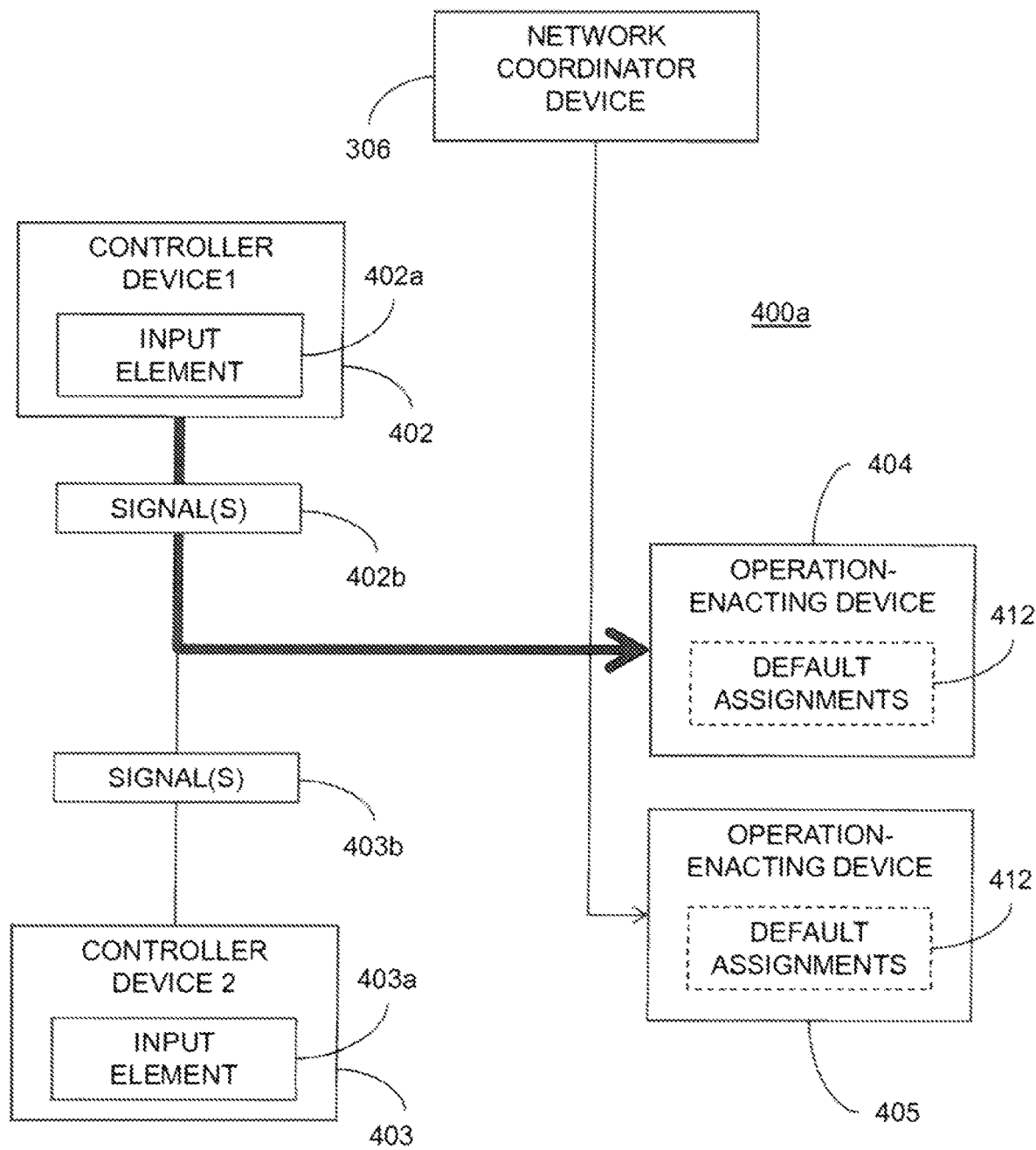
FIG. 4A illustrates an example scenario where operation-enacting devices respond to signals from controller devices according to a first set of assignments, according to aspects of the present disclosure.
Figure 4B:
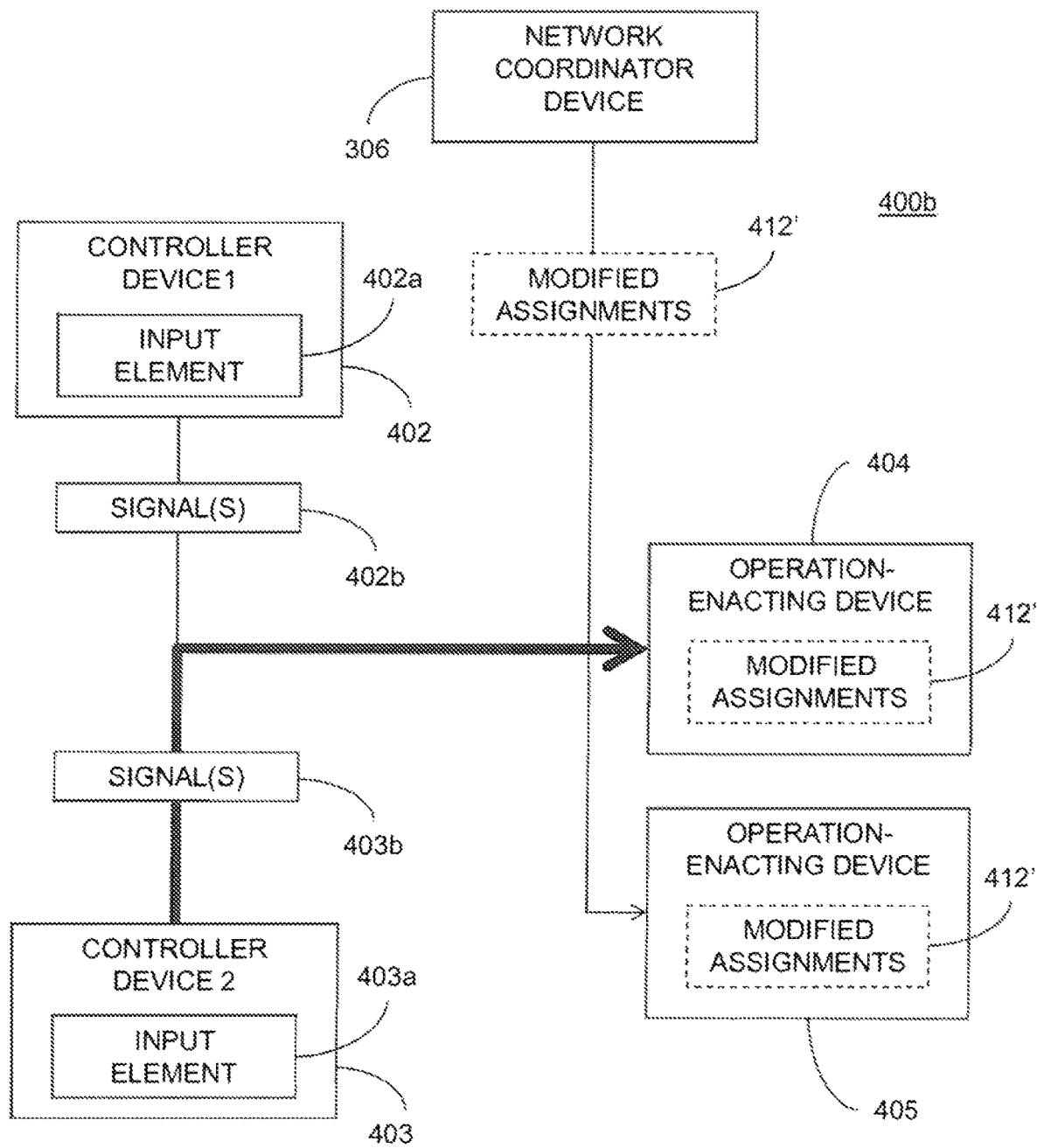
FIG. 4B illustrates an example scenario where operation-enacting devices respond to signals from controller devices according to a second set of assignments, according to aspects of the present disclosure.
Figure 4C:
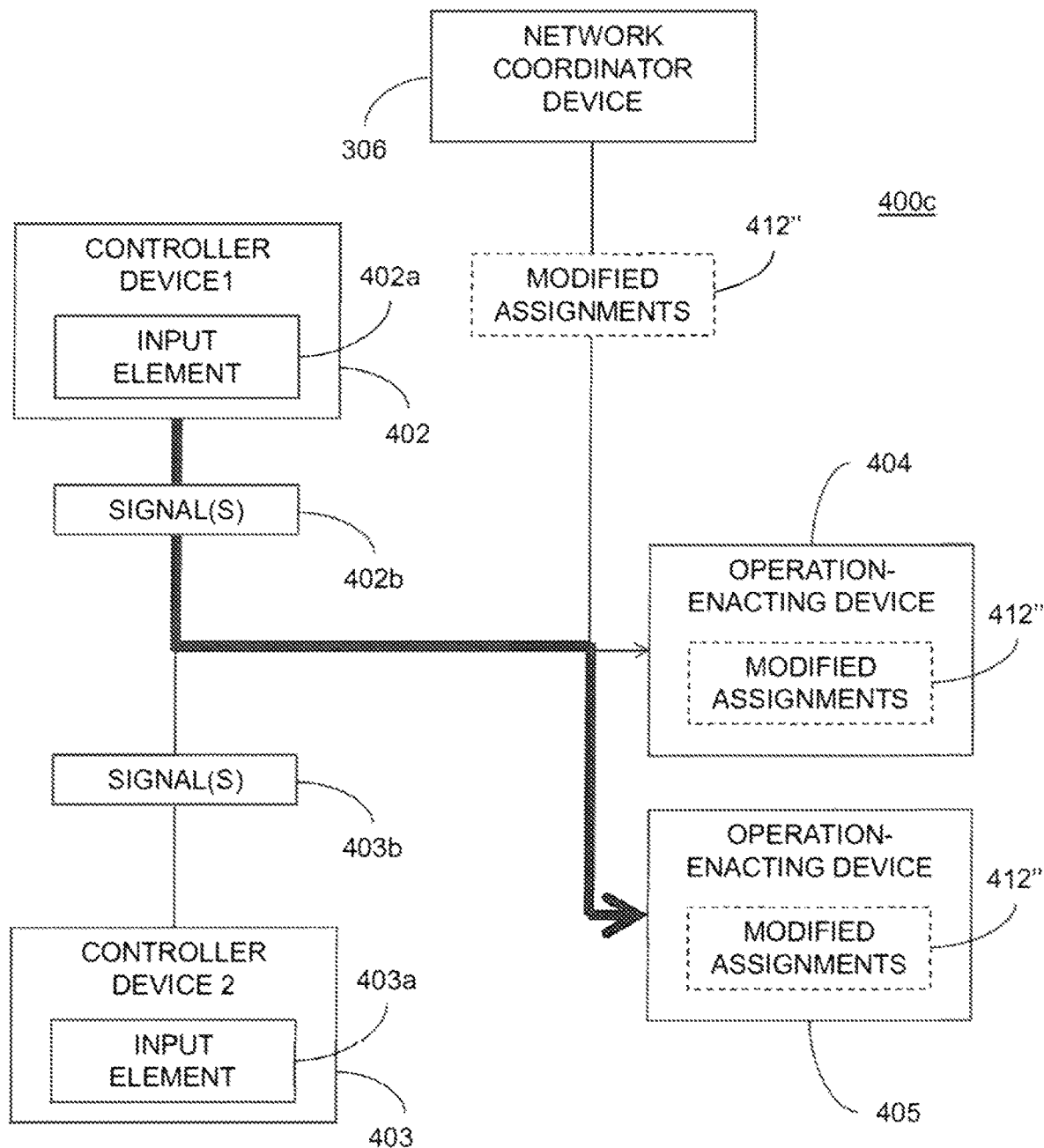
FIG. 4C illustrates an example scenario where operation-enacting devices respond to signals from controller devices according to a third set of assignments, according to aspects of the present disclosure.

FIGS. 4A-C illustrate example scenarios 400a-c that further demonstrate how a modified set of assignments may be implemented in the system 300. The controller devices 302 paired to the wireless network 308 include a first controller device 402 and a second controller device 403. The first controller device 402 includes a first input element 402a configured to receive a first input from the user. The first input from the user modifies a state of the first input element 402a. The second controller device 403 includes a second input element 403a configured to receive a second input from the user. The second input from the user modifies a state of the second input element 403a. For example, the first input element 402a may be a right shift lever, and the second input element 403a may be a left shift lever. The user may engage either shift lever so that the state of the shift lever may be modified to any of the following: (i) an active state when engaged by the user for less than a threshold amount of time; (ii) an inactive state when not engaged by the user; or (iii) an update state when continuously engaged by the user for at least the threshold amount of time. The signals 302b from the controller devices 302 include a first signal 402b from the first controller device 402 and a second signal 403b from the second controller device 403. The first signal 402b indicates the modified state of the first input element 402a and the second signal 403b indicates the modified state of the second input element 403a. The signals 302b from a particular controller device 302 may include a device type identification for the particular controller device 302, an input identifier for the input element 302a on the particular controller device 302 (in case there is more than one input element 302a), and information on the modified state for the input element 302a. The signals 302b may include more, less, and/or different data.

The operation-enacting devices 304 include a first operation-enacting device 404 and a second operation-enacting device 405. For example, the first operation-enacting device 404 may be a front suspension system, and the second operation-enacting device 405 may be a rear suspension system. According to a first set of assignments 412 shown in FIG. 4A, the first operation-enacting device 404 is configured to: (i) identify the first signal 402b among the signals 302b received from the controller devices 302; (ii) identify the modified state of the first input element 402a; and (iii) enact a first operation on the bicycle in response to the modified state of the first input element 402a.

As shown in FIG. 4B, the network coordinator device 306 is configured to (i) receive a second set of assignments 412', and (ii) transmit the second set of assignments 412' to the first operation-enacting device 404 via the wireless network 308. The first operation-enacting device 404 is configured to receive the second signal 403b from the second controller device 403 via the wireless network 308. Responsive to receiving the second set of assignments 412', the first operation-enacting device 404 is modified to: (i) identify the modified state of the second input element 403a, (ii) enact the first operation on the bicycle in response to the modified state of the second input element 403a, and (iii) remain idle in response to the first signal from the first controller device 402.

As shown in FIG. 4C, the network coordinator device is configured to (i) receive a third set of assignments 412", and (ii) transmit the third set of assignments 412" to the operation-enacting devices 304 via the wireless network 308. The second operation-enacting device 405 is configured to receive the first signal 402b from the first controller device 402 via the wireless network 308. Responsive to receiving the third set of assignments 412", (i) the second operation-enacting device 405 is configured to identify the modified state of the first input element 402a and to enact a second operation on the bicycle in response to the modified state of the first input element 402a, and (ii) the first operation-enacting device 404 is modified to remain idle in response to the first signal from the first controller device.

Figure 8:
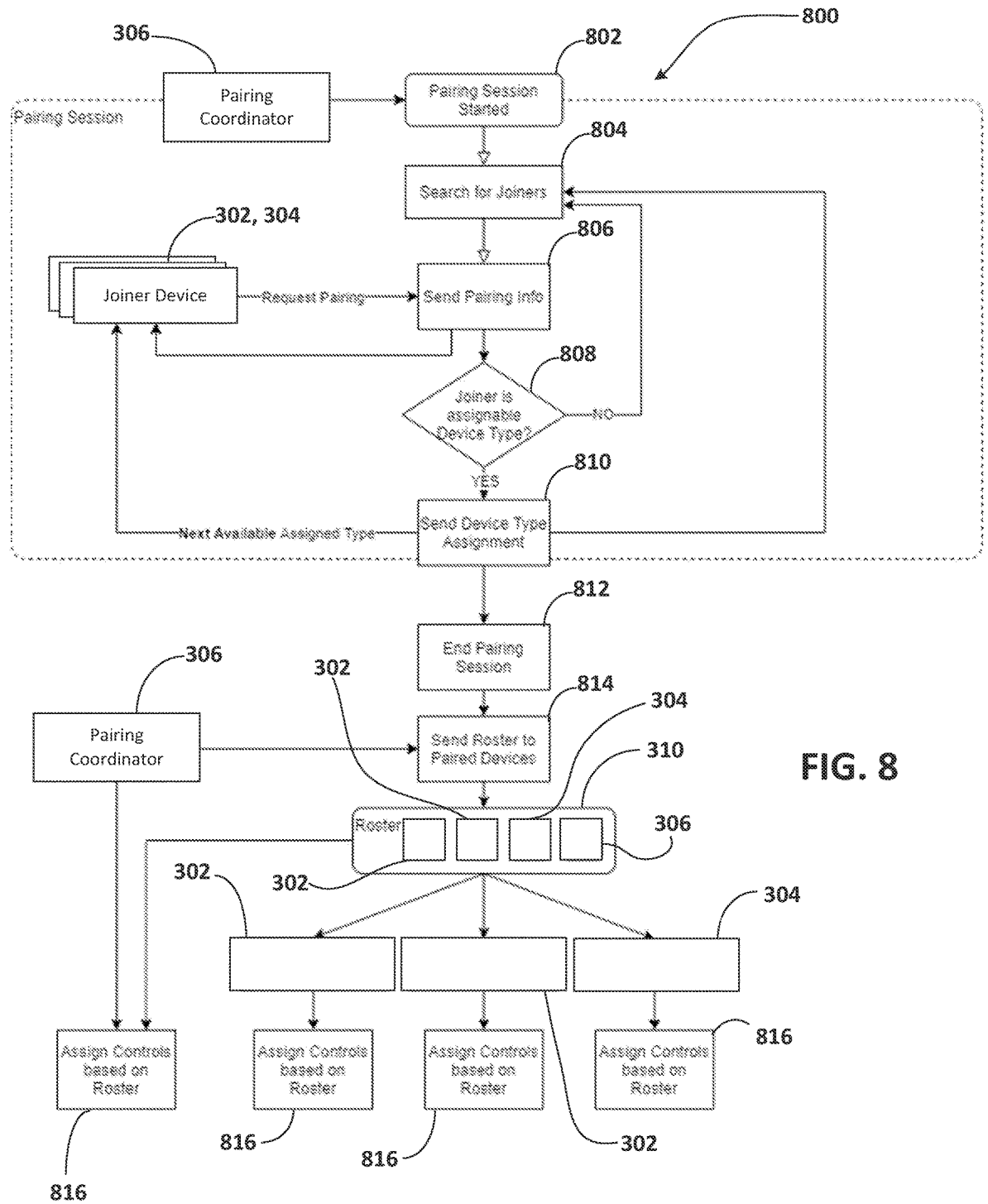
FIG. 8 illustrates a flow chart for an embodiment for a method of establishing a wireless network between assignable controller devices and operation-enacting devices of a bicycle.

FIG. 8 illustrates a method 800 for establishing a wireless network between a network coordinator device (e.g., a pairing coordinator device), controller devices (e.g., a number of assignable controller devices and a number of non-assignable, or standard, controller devices), and operation-enacting devices, and establishing a set of default assignments that determine how the operating-enacting devices enact the operations in response to the signals received from the controller devices. The acts of the method presented below are intended to be illustrative. In some embodiment, the method may be accomplished with one or more additional acts not described, and/or without one or more of the acts discussed. Additionally, the order in which the acts of the method are illustrated in FIG. 8 and described below is not intended to be limiting.

In some embodiments, the method may be implemented in one or more processing devices (e.g., digital processor, an analog processor, a digital circuit configured to process information, an analog-circuit configured to process information, a state machine, and/or other mechanisms for electronically processing information). The one or more processing devices include one or more devices executing some or all the acts of the method in response to instructions stored electronically on an electronic storage medium. The one or more processing devices configured, through hardware, firmware, and/or software, to be specifically configured for execution of one or more of the acts of the method.

In act 802, the network coordinator device (e.g., the network coordinator device 306) is configured to initiate a new pairing session to pair, for example, the controller devices (e.g., the controller devices 302) and the operation-enacting devices (e.g., the operation-enacting devices 304) to the wireless network (e.g., the wireless network 308). In act 802, the user may select the network coordinator device from among, for example, the controller devices and operation-enacting devices by operating a pairing input element (e.g., the pairing input element 306c) such as a pushbutton, switch, or the like that prompts the selected network coordinator device to initiate a new pairing session. While in the pairing mode, in act 804, the network coordinator device scans for pairing signals from other devices. In other words, the network coordinator device searches for controller devices and operation-enacting devices that want to join the wireless network (e.g., joiners).

When the new pairing session is active, the user may selectively pair a controller device or an operation-enacting device to the wireless network by operating a corresponding pairing input element such as a pushbutton, switch, or the like on the given device to be placed into pairing mode. While in pairing mode, in act 806, the selected device transmits a pairing signal to the network coordinator device in response to operation of the pairing input element of the selected device.

In act 808, the network coordinator device determines whether the selected device is an assignable device (e.g., an assignable controller devices). The network coordinator device may determine whether the selected device is, for example, an assignable controller based on the transmitted pairing signal. The transmitted pairing signal may include a device type code, and the network coordinator device may determine whether the selected device is an assignable controller based on the device type code within the transmitted pairing signal. A standard controller is programmed with static device type codes that do not change throughout a lifespan of the component. Each assignable controller may be programmed with an assignable device type (e.g., an assignable device type code) at manufacturing. For example, the assignable device type code may be stored in a memory of the respective assignable controller). As an example, the assignable device type code may be 96 or 114, though additional, fewer, and/or different assignable device type codes may be provided. In one embodiment, a first assignable device type code (e.g., 96) corresponds to a single button assignable controller, and a second assignable device type code (e.g., 114) corresponds to a two button assignable controller.

In one embodiment, one or more ranges of device type codes may correspond to one or more assignable controllers. For example, device type codes of 96-113 may correspond to a single button assignable controller device, and device type codes of 114-127 may correspond to a two-button assignable controller device. At manufacturing, each of the single button assignable controller devices may be programmed with a device type code (e.g., an assignable device type code) of 96, and each of the two-button assignable controller devices may be programmed with a device type code (e.g., an assignable device type code) of 114. Through execution of the method 800, these assignable device type codes programmed at manufacturing, for example, may be updated. Accordingly, the determination of whether the selected device is an assignable device may include comparing the device type code stored at the selected device to the one or more ranges of device type codes (e.g., within the range of device type codes of 96-113 for a single button assignable controller device and within the range of device type codes of 114-127 for a two-button assignable controller device).

When the network coordinator device determines the selected device is an assignable controller, the method moves to act 810. When the network coordinator device determines the selected device is not an assignable controller (e.g., is a standard controller), the pairing signal allows the network coordinator device to recognize the given device and permit the given device to join the wireless network. If a proprietary network protocol is employed for the wireless network (e.g., the wireless network 308), only devices configured to communicate according to the proprietary network protocol may be recognized by the network coordinator device and paired. The method then returns to act 804.

In act 810, when the selected device is determined to be an assignable controller, for example, the network coordinator device programs the selected device with a new assigned device type code. For example, a memory of the selected device may store the new assigned device type code. In one embodiment, the new assigned device type code is stored in the memory of the selected device, such that the device type code programmed at manufacturing, for example, is replaced.

For example, the network coordinator device programs selected devices the network coordinator device determines to be assignable devices new assigned device type codes in increasing numerical order based on the assignable device type (e.g., a single button assignable controller or a two button assignable controller) and an order in which the assignable devices are paired into the wireless network.

In one embodiment, if the selected device has a device type code of 96-113 (e.g., a device type code of 96, which indicates a single button assignable controller) and is a first single button assignable controller to be paired into the wireless network 308, the network coordinator device 306 programs the selected device with the device type code of 97. The second single button assignable controller to be paired into the wireless network (e.g., based on a device type of 96-113) is programmed with the device type code of 98, and the third single button assignable controller to be paired into the wireless network (e.g., based on a device type of 96-113) is programmed with the device type code of 99. This pattern continues for each additional single button assignable controller that is to be paired into the wireless network.

If the selected device has a device type code of 114-127 (e.g., a device type code of 114, which indicates a two button assignable controller) and is a first two button assignable controller to be paired into the wireless network, the network coordinator device programs the selected device with the device type code of 115. The second two button assignable controller to be paired into the wireless network (e.g., based on a device type code of 114-127) is programmed with the device type code of 116, and the third assignable device to be paired into the wireless network (e.g., based on a device type code of 114-127) is programmed with the device type code of 117. This pattern continues for each additional two button assignable controller that is to be paired into the wireless network.

Additional, fewer, and/or different device type codes may be used for single button assignable controllers and/or two button assignable controllers. In one embodiment, the assignment of device types may be provided for assignable controllers with a greater number of buttons (e.g., three buttons). For example, three button assignable controllers may be programed with a device type code of 128 at manufacturing and may be assigned a device type code of 129-141 depending on an order of pairing into the wireless network.

After the assignment of the new assigned device type code in act 810, the method returns to act 804 unless the pairing session is ended. In act 812, the user may manually end the pairing session (e.g., by operating the pairing input element 306c on the network coordinator device 306). Alternatively, the network coordinator device may automatically end the pairing session after a set time period has elapsed.

A roster (e.g., the roster 310) is defined by the controller devices and the operation-enacting devices that have been paired to the wireless network at the end of the pairing session. To enhance the integrity of the system, no other devices may be paired to the wireless network after the pairing session has ended. By fixing the roster, the system only includes the devices (e.g., the devices 302, 304) selected by the user. This blocks unauthorized devices from joining the wireless network and maliciously or accidentally interfering with the operation of the devices (e.g., the devices 302, 304) actually selected by the user.

In act 814, when the pairing session ends, the network coordinator device transmits, to the operation-enacting devices, the roster identifying the controller devices and the operation-enacting devices paired to the wireless network. In act 816, the operation-enacting devices are configured to determine, based on the roster received from the network coordinator device, how to enact operations in response to the signals (e.g., signals 302b) received from the controller devices.

If desired, a new pairing session may be initiated with the network coordinator device to reset the roster and to pair a different set of devices (e.g., a different set of devices 302, 304). At the end of the new pairing session, this different set of devices defines a new roster (e.g., a new roster 310). The new pairing session unpairs and resets all devices that may have been added to the wireless network in a previous pairing session. In general, paired devices cannot be removed from the roster, and new devices cannot be added to the roster until a new pairing session is initiated. A device paired to the wireless network may be paired into another wireless network (e.g., on another bicycle system), but that device cannot rejoin the prior wireless network because the prior wireless network is reset when paired to the other wireless network.

The operation-enacting devices are configured to process a default set of assignments (e.g., the default set of assignments 312) based on the roster (e.g., the roster 310) to determine how the operation-enacting devices enact the operations responsive to the signals (e.g., the signals 302*b*). The default set of assignments may be transmitted to each operation-enacting device by the network coordinator device and/or stored locally on each operation-enacting device 304.

Figure 9A:
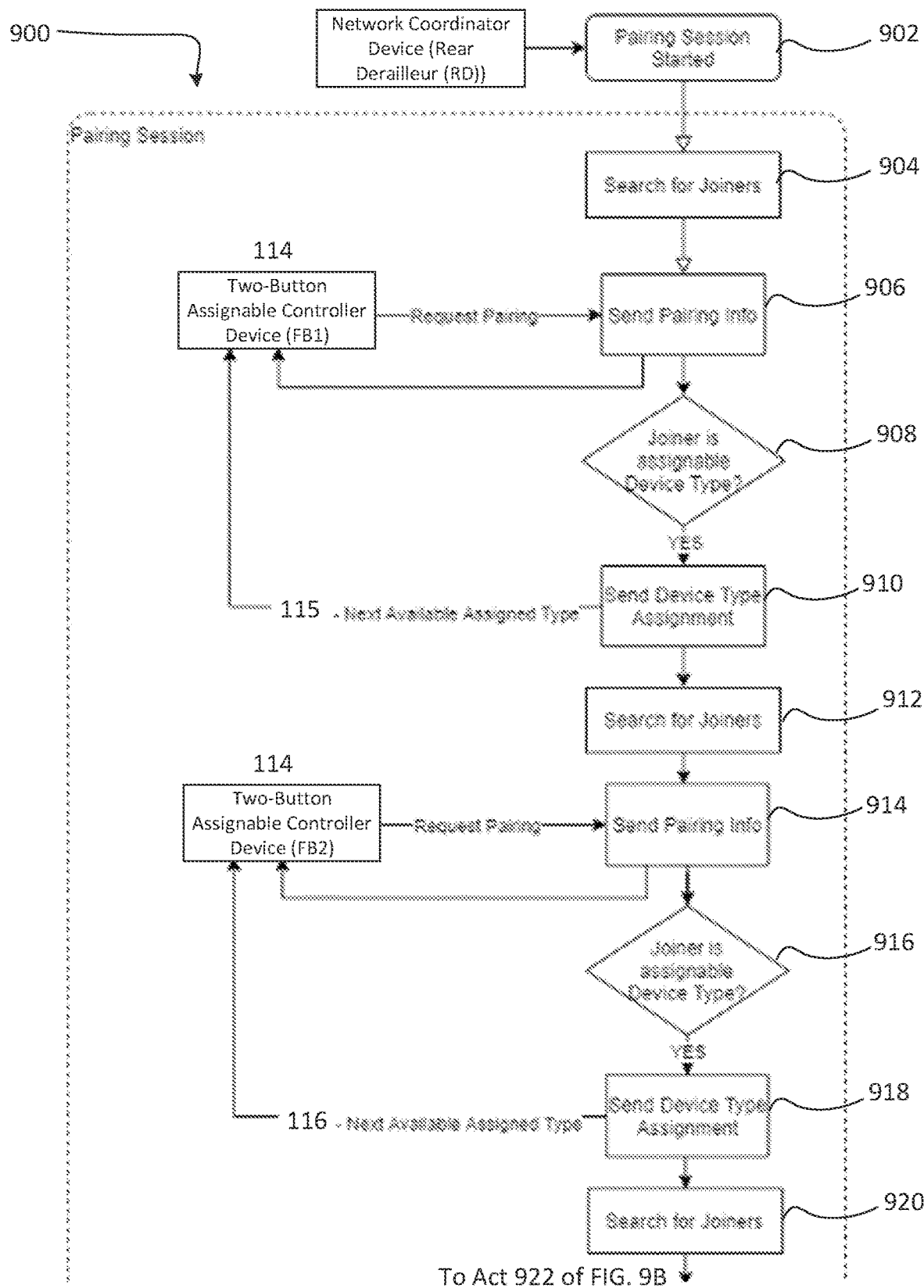
FIGS. 9A-9B illustrate a flow chart for an exemplary establishing of the wireless network of the method of FIG. 8.
Figure 9B:
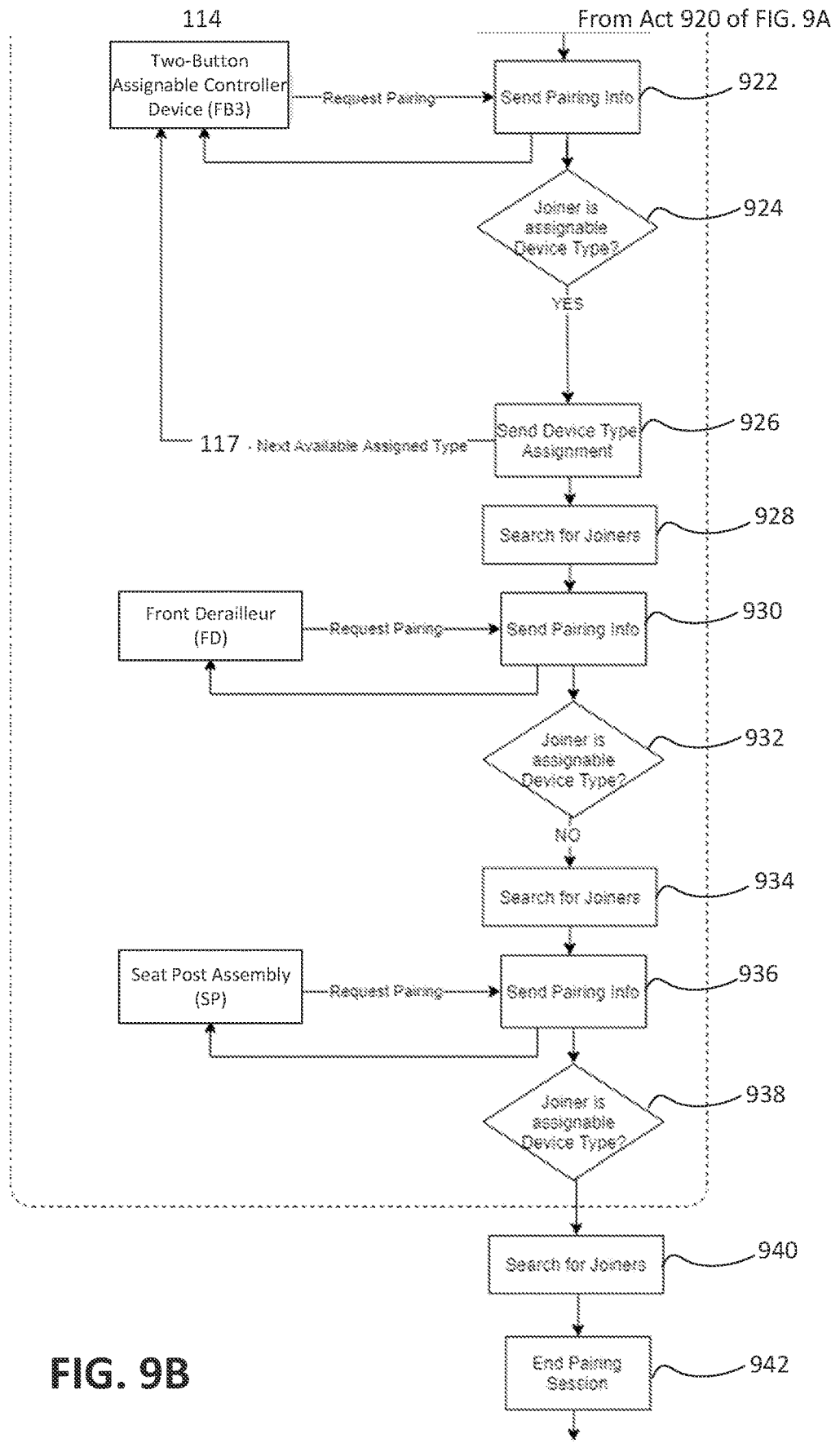

FIGS. 9A-9B illustrate an embodiment of a method 900 for establishing a wireless network between a network coordinator device, controller devices (e.g., a number of assignable controller devices and a number of non-assignable, or standard, controller devices), and operation-enacting devices. The controller devices include three two-button assignable controllers (e.g., flat bar shifters), the operation-enacting devices include a seat post assembly, a front derailleur, and a rear derailleur, and the rear derailleur is defined as the network coordinator device. Other devices may, however, be selected as the network coordinator device. The acts of the method presented below are intended to be illustrative. In some embodiments, the method may be accomplished with one or more additional acts not described, and/or without one or more of the acts discussed. Additionally, the order in which the acts of the method are illustrated in FIGS. 9A-9B and described below is not intended to be limiting.

In some embodiments, the method 900 may be implemented in one or more processing devices (e.g., digital processor, an analog processor, a digital circuit configured to process information, an analog-circuit configured to process information, a state machine, and/or other mechanisms for electronically processing information). The one or more processing devices include one or more devices executing some or all the acts of the method in response to instructions stored electronically on an electronic storage medium. The one or more processing devices, configured through hardware, firmware, and/or software, for execution of one or more of the acts of the method.

In act 902, a network coordinator device (e.g., the rear derailleur) is configured to initiate a new pairing session to pair, for example, the three two-button assignable controllers, the seat post assembly, and the front derailleur to a wireless network with the rear derailleur. In act 902, the user may select the network coordinator device from among controller devices and operation-enacting devices of the bicycle by operating a pairing input element such as a pushbutton, switch, or the like that prompts the selected network coordinator device (e.g., the rear derailleur) to initiate a new pairing session.

While in the pairing mode, in act 904, the rear derailleur, for example, scans for pairing signals from other devices. In other words, the rear derailleur searches for controller devices and operation-enacting devices that want to join the wireless network (e.g., joiners).

When the new pairing session is active, the user may selectively pair a controller device or an operation-enacting device (e.g., a first selected device) to the wireless network by operating a corresponding pairing input element such as a pushbutton, switch, or the like on the given device to be placed into pairing mode. While in pairing mode, in act 906, the first selected device transmits a pairing signal to the rear derailleur, for example, in response to operation of the pairing input element of the first selected device.

In act 908, the rear derailleur determines whether the first selected device is an assignable device (e.g., a first assignable controller). The rear derailleur may determine whether the first selected device is, for example, an assignable controller based on the transmitted pairing signal. The transmitted pairing signal may include a device type code, and the rear derailleur may determine whether the first selected device is an assignable controller based on the device type code within the transmitted pairing signal.

In the example shown in FIGS. 9A-9B, the first selected device has a device type of 114, which indicates a two-button assignable controller, and the rear derailleur determines the first selected device is an assignable controller. In act 910, after the rear derailleur determines the first selected device is the first assignable controller in act 908, the rear derailleur programs the first assignable controller with a new assigned device type code. In the example shown in FIGS. 9A-9B, the rear derailleur programs the first assignable controller with new assigned device type code 115, and the first assignable controller is allowed to pair into the wireless network. For example, the new assigned device type code is stored in a memory of the first assignable controller (e.g., replacing an original or most recently stored device type code).

In act 912, the rear derailleur continues scanning for pairing signals from other devices. While still in pairing mode, in act 914, a second selected device transmits a pairing signal to the rear derailleur in response to operation of the pairing input element of the second device.

In act 916, the rear derailleur determines whether the second selected device is an assignable device (e.g., a second assignable controller). The rear derailleur may determine whether the second selected device is, for example, an assignable controller based on the transmitted pairing signal. The transmitted pairing signal may include a device type code, and the rear derailleur may determine whether the second selected device is an assignable controller based on the device type code within the transmitted pairing signal.

In the example shown in FIGS. 9A-9B, the second selected device has a device type of 114, which indicates a two-button assignable controller, and the rear derailleur determines the second selected device is an assignable controller. In act 918, after the rear derailleur determines the second selected device is the second assignable controller in act 916, the rear derailleur programs the second assignable controller with a new assigned device type code. In the example shown in FIGS. 9A-9B, the rear derailleur programs the second assignable controller with new assigned device type code 116, and the second assignable controller is allowed to pair into the wireless network.

In act 920, the rear derailleur continues scanning for pairing signals from other devices. While still in pairing mode, in act 922, a third selected device transmits a pairing signal to the rear derailleur in response to operation of the pairing input element of the third device.

In act 924, the rear derailleur determines whether the third selected device is an assignable device (e.g., a third assignable controller). The rear derailleur may determine whether the third selected device is, for example, an assignable controller based on the transmitted pairing signal. The transmitted pairing signal may include a device type code, and the rear derailleur may determine whether the third selected device is an assignable controller based on the device type code within the transmitted pairing signal.

In the example shown in FIGS. 9A-9B, the third selected device has a device type of 114, which indicates a two-button assignable controller, and the rear derailleur determines the third selected device is an assignable controller. In act 926, after the rear derailleur determines the third selected device is the third assignable controller in act 924, the rear derailleur programs the third assignable controller with a new assigned device type code. In the example shown in FIG. 9, the rear derailleur programs the third assignable controller with new assigned device type code 117, and the third assignable controller is allowed to pair into the wireless network.

In act 928, the rear derailleur continues scanning for pairing signals from other devices. While still in pairing mode, in act 930, a fourth selected device transmits a pairing signal to the rear derailleur in response to operation of the pairing input element of the fourth device.

In act 932, the rear derailleur determines whether the fourth selected device is an assignable device. The rear derailleur may determine whether the fourth selected device is, for example, an assignable controller based on the transmitted pairing signal. The transmitted pairing signal may include a device type code, and the rear derailleur may determine whether the fourth selected device is an assignable controller based on the device type code within the transmitted pairing signal.

In the example shown in FIGS. 9A-9B, the rear derailleur determines the fourth selected device is not an assignable device (e.g., determines the fourth selected device is a standard device). As part of act 932, the rear derailleur only pairs standard devices having a different device type than the rear derailleur. For example, the pairing signal may identify the fourth selected device to be a front derailleur, and the front derailleur is allowed to pair into the wireless network.

In act 934, the rear derailleur continues scanning for pairing signals from other devices. While still in pairing mode, in act 936, a fifth selected device transmits a pairing signal to the rear derailleur in response to operation of the pairing input element of the fifth device.

In act 938, the rear derailleur determines whether the fifth selected device is an assignable device. The rear derailleur may determine whether the fifth selected device is, for example, an assignable controller based on the transmitted pairing signal. The transmitted pairing signal may include a device type code, and the rear derailleur may determine whether the fifth selected device is an assignable controller based on the device type code within the transmitted pairing signal.

In the example shown in FIGS. 9A-9B, the rear derailleur determines the fifth selected device is not an assignable device (e.g., determines the fifth selected device is a standard device). As part of act 938, the rear derailleur only pairs standard devices having a different device type than the rear derailleur and the front derailleur. For example, the pairing signal may identify the fifth selected device to be a seat post assembly, and the seat post assembly is allowed to pair into the wireless network.

In act 940, the rear derailleur continues scanning for pairing signals from other devices. In act 942, the user may manually end the pairing session (e.g., by operating the pairing input element on the rear derailleur). Alternatively, the rear derailleur may automatically end the pairing session after a set time period has elapsed.

After all selected devices have been paired and the pairing session is closed, the network coordinator device (e.g., the rear derailleur) then uses a roster of the paired devices to designate default reactions. The default reactions are mapped to, for example, the assignable controllers. For example, a first button of the first assignable controller has a default reaction of an outboard shift, and a second button of the first assignable controller has a default reaction of an inboard shift. In one embodiment, in which one button assignable controllers are paired into the wireless network, the first assignable controller may have a default reaction of an outboard shift, and the second assignable controller may have a default reaction of an inboard shift.

Figure 10:
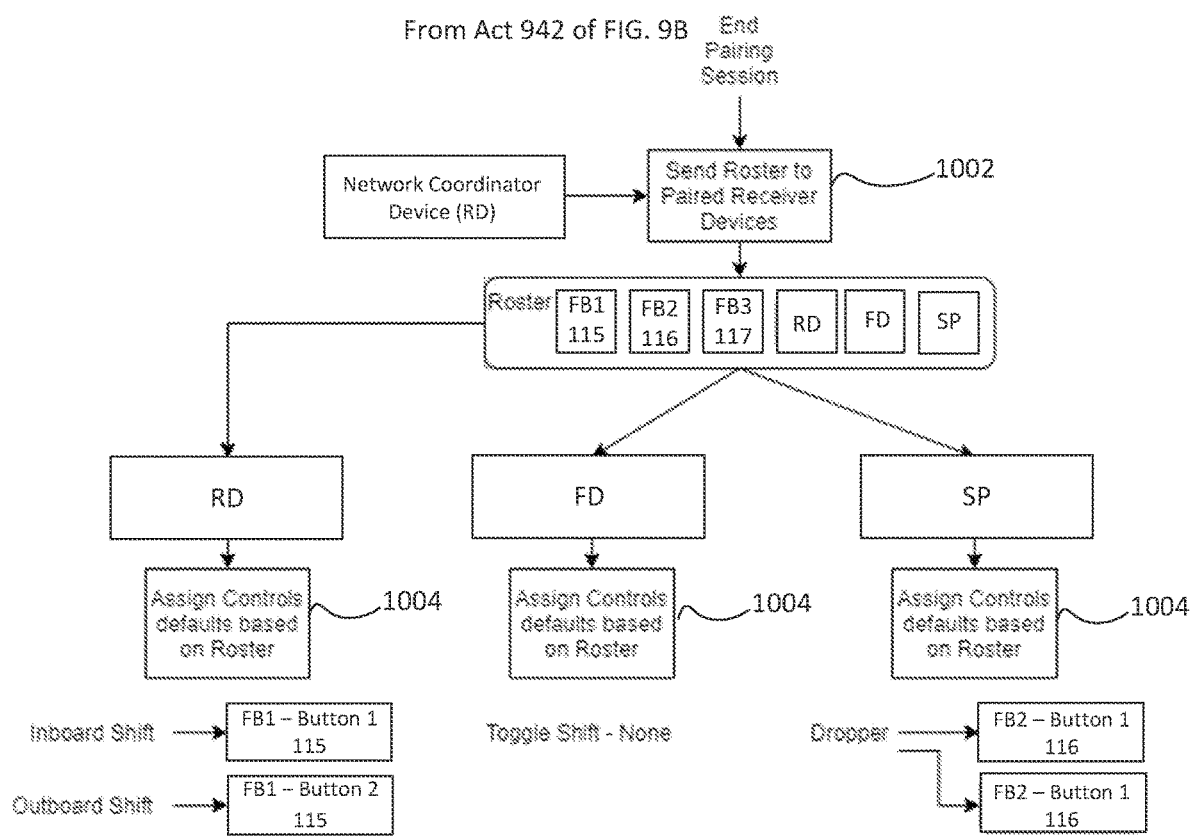
FIG. 10 illustrates a flow chart for a first exemplary designation of default reactions of the method of FIG. 8.

FIG. 10 illustrates an embodiment of a method for mapping default reactions to assignable controllers. The method shown in FIG. 10 may be a continuation of the method of FIG. 9 or another method for establishing a wireless network. The acts of the method presented below are intended to be illustrative. In some embodiment, the method may be accomplished with one or more additional acts not described, and/or without one or more of the acts discussed. Additionally, the order in which the acts of the method are illustrated in FIG. 10 and described below is not intended to be limiting.

In some embodiments, the method may be implemented in one or more processing devices (e.g., digital processor, an analog processor, a digital circuit configured to process information, an analog-circuit configured to process information, a state machine, and/or other mechanisms for electronically processing information). The one or more processing devices include one or more devices executing some or all the acts of the method in response to instructions stored electronically on an electronic storage medium. The one or more processing devices are configured, through hardware, firmware, and/or software, for execution of one or more of the acts of the method.

A roster is defined by the controller devices and the operation-enacting devices that have been paired to the wireless network at the end of the pairing session (e.g., the first assignable controller, the second assignable controller, the third assignable controller, the rear derailleur, the front derailleur, and the seat post assembly). To enhance the integrity of the system, no other devices may be paired to the wireless network after the pairing session has ended. By fixing the roster, the system only includes the devices selected by the user. This blocks unauthorized devices from joining the wireless network and maliciously or accidentally interfering with the operation of the devices actually selected by the user.

In act 1002, when the pairing session ends, the rear derailleur, for example, is configured to transmit, to the operation-enacting devices of the wireless network (e.g., the front derailleur (FD) and the seat post (SP) assembly), the roster identifying the controller devices (e.g., the first assignable controller device, the second assignable controller device, and the third assignable controller device) and the operation-enacting devices (e.g., the rear derailleur (RD), the front derailleur (FD), and the seat post (SP) assembly) paired to the wireless network. In act 1004, the RD, the FD, and the SP assembly, as illustrated in FIG. 10, for example, are configured to determine, based on the roster transmitted by the rear derailleur, how to enact operations in response to signals received from the first assignable controller device FB1, the second assignable controller device FB2, and the third assignable controller device FB3.

In the example shown in FIG. 10, the first assignable controller device FB1, which was the first assignable controller device paired into the wireless network, is assigned a first default action or control and a second default action or control. For example, a first button (e.g., first input element) of the first assignable controller device FB1 is assigned an action of inboard shift of the RD, and a second button (e.g., second input element) of the first assignable controller FB1 is assigned an action of outboard shift of the RD. The second assignable controller device FB2, which was the second assignable controller device paired into the wireless network, is assigned a third default action or control. For example, a first button and a second button of the second assignable controller device FB2 are both assigned an action of actuation of a dropper of the SP assembly. According to this example of mapping default reactions to assignable controller devices, the third assignable controller device FB3 does not have a default action, and the FD does not have a default associated controller device.

Figure 11:
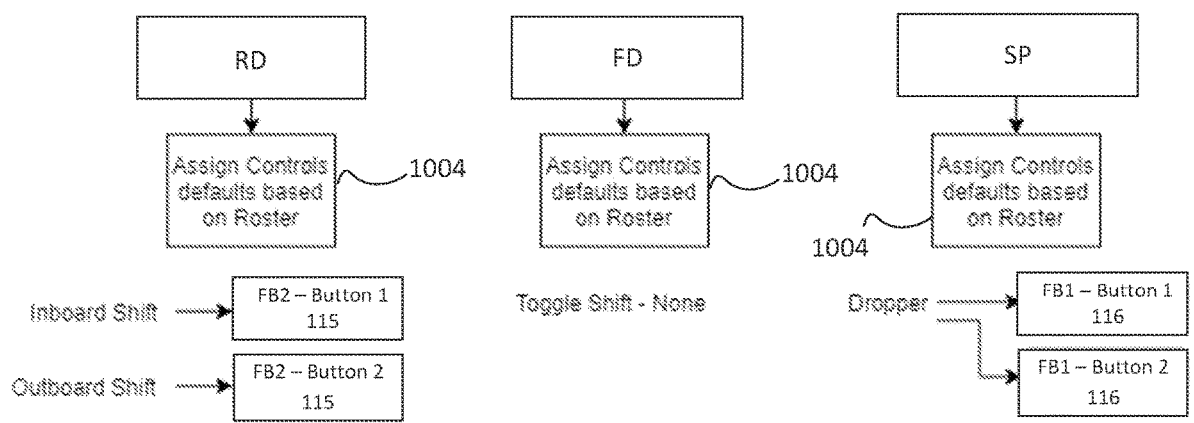
FIG. 11 illustrates a flow chart for a second exemplary designation of default reactions of the method of FIG. 8.

Different mapping may be provided with different pairing orders. If assignable controller devices are re-paired into a new system, device types are again overwritten to be programmed with a new assigned device type by a pairing coordinator device (e.g., the network coordinator device). Referring to FIG. 11, for example, if the second assignable controller device FB2 is paired into the wireless network before the first assignable controller device FB1 is paired into the wireless network, the second assignable controller device FB2 may control the RD instead of the first assignable controller device FB1. Further, the first assignable controller device FB1 may control the SP assembly instead of the second assignable controller device FB2.

While the methods of the present embodiments facilitate default reaction designations, all controller devices, both standard controller devices and assignable controller devices, may be reconfigured after pairing. For example, the designations may be reconfigured via, for example, a mobile device application (e.g., the application 316) in communication with the network coordinator.

Assignable controller devices (e.g., controller devices 302 that are assignable, as defined by device type codes programmed in the controller devices 302, respectively) are configured for multiple of a same controller device to be mounted on the bicycle 100, with placement of the assignable controller devices 302 on the bicycle 100 being at the discretion of the user. While the user may use a mobile device application (e.g., the application 316), for example, to reconfigure designations, representations of the same assignable controller devices 302, for example, may have a same name and same artwork (e.g., icon) within a graphical user interface (GUI) displayed within the application 316 at a display of a mobile device (e.g., the external computing device 314). The representations may thus be difficult to distinguish from each other within the application 316. For example, if the user builds a bicycle with two standard controllers and two assignable controllers, when the user opens the application 316, representations of four devices are displayed within the application 316. While each representation of the two standard controllers displays unique art (e.g., a unique icon) and a unique name, the user may not be able to determine which representation within the application 316 (e.g., which icon) corresponds to which assignable controller device 302.

Figure 12:
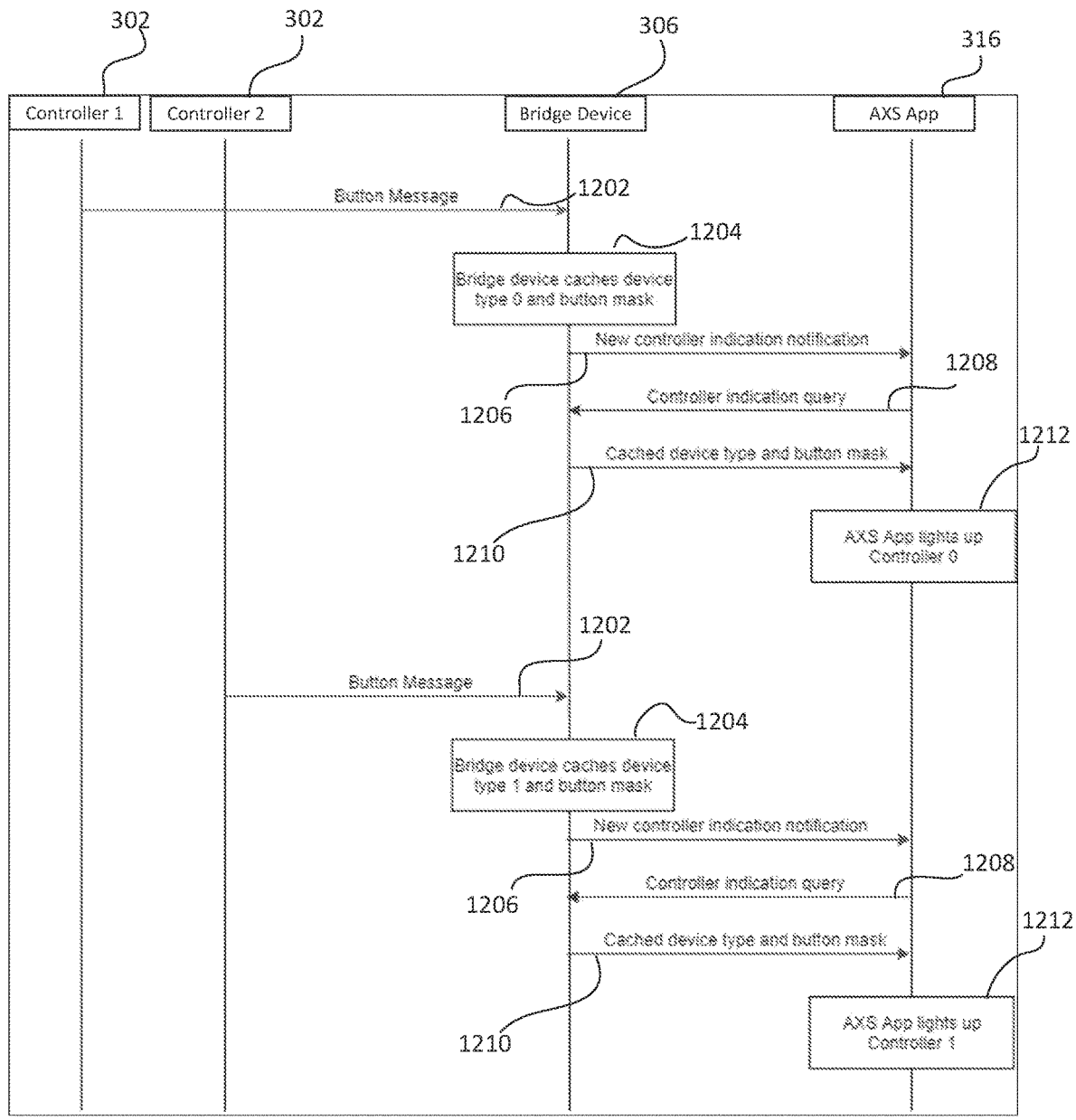
FIG. 12 illustrates a flow chart for an embodiment for a method of indicating, within a mobile device application, which controller button has been pressed.

FIG. 12 illustrates a method 1200 for indicating, within a mobile application or other software (e.g., a mobile device application), which input element (e.g., button) of which controller device has been pressed. The acts of the method 1200 presented below are intended to be illustrative. In some embodiments, the method 1200 may be accomplished with one or more additional acts not described, and/or without one or more of the acts discussed. Additionally, the order in which the acts of the method 1200 are illustrated in FIG. 12 and described below is not intended to be limiting.

In some embodiments, the method 1200 may be implemented in one or more processing devices (e.g., digital processor, an analog processor, a digital circuit configured to process information, an analog-circuit configured to process information, a state machine, and/or other mechanisms for electronically processing information). The one or more processing devices include one or more devices executing some or all the acts of the method 1200 in response to instructions stored electronically on an electronic storage medium. The one or more processing devices are configured, through hardware, firmware, and/or software, for execution of one or more of the acts of the method.

Referring to the example of FIG. 12, "Controller 0" is a first assignable controller device, and "Controller 1" is a second assignable controller device on a bicycle (e.g., the bicycle 100). The first assignable controller device and the second assignable controller device are same controller devices (e.g., identical controller devices). "Bridge Device" corresponds to a coordinator device (e.g., the network coordinator device 306) or another computing device (e.g., a controller device) on the bicycle. "AXS App" corresponds to, for example, an application (e.g., the application 316) running on a mobile device (e.g., the external computing device 314). The coordinator device is in communication with the first assignable controller device, the second assignable controller device, and the application running on the mobile device. For example, the coordinator device is in communication with the first assignable controller device and the second assignable controller device via a first wireless network (e.g., established via pairing session as described above), and is in communication with the mobile device via a second wireless network. In one embodiment, data may be communicated via the first wireless network and the second wireless network using different protocols or standards. In another embodiment, data may be communicated via the first wireless network and the second wireless network using a same protocol or standard. In other words, the first wireless network and the second wireless network may be parts of an overall wireless network, via which at least the coordinator device, the first assignable controller device, the second assignable controller device, and the mobile device may communicate.

In act 1202, in response to user input (e.g., a button press) at an input element (e.g., a button) of the first assignable controller device, the first assignable controller device generates and transmits a message or signal (e.g., a button message) to the coordinator device. In one embodiment, the first assignable controller device also transmits the button message to other devices of the bicycle (e.g., paired within the first wireless network of the bicycle). For example, the first assignable controller device may transmit the button message to all receivers of the first wireless network of the bicycle (e.g., all controller devices and operation-enacting devices paired to the coordinator device).

The button message, for example, includes data identifying a device type and data identifying the input element, the activation of which initiated the generation of the button message. The data identifying the device type may be, for example, a device type code, as discussed above, and the data identifying the input element may be a bitmask (e.g., a button mask) with one or more bits associated with, for example, the first assignable controller (e.g., associated with one or more input elements or buttons of the first assignable controller). For example, the bitmask may include bits associated with one or more input elements of the first assignable controller, respectively, and a bit of the bitmask may be set when a corresponding input element is activated.

In act 1204, the coordinator device stores the data identifying the device type and the data identifying the input element for the first assignable controller device within a memory of the coordinator device. For example, the coordinator device may store the data identifying the device type and the data identifying the input element within cache of the coordinator device.

In act 1206, the coordinator device generates a notification based on the button message received by the coordinator device. The coordinator device transmits the notification to the application running on the mobile device via the second wireless network. The notification identifies that a new controller device has been heard by the coordinator device.

In act 1208, in response to the notification transmitted to the mobile device by the coordinator device, the mobile device (e.g., via the application running on the mobile device) generates a request and transmits the request to the coordinator device via the second wireless network. The request is for information about the newly heard controller device (e.g., data related to the received button message).

In act 1210, the coordinator device retrieves the data identifying the device type and the data identifying the input element (e.g., the button mask) for the first assignable controller device stored (e.g., cached) at the coordinator device. The coordinator device transmits, for example, the cached data to the mobile device via, for example, the second wireless network. The cached data may be the only cached data related to device type and input element stored at the coordinator device. For example, when the coordinator device stores the data identifying the device type and the data identifying the input element within cache of the coordinator device, the coordinator device may overwrite device type data and input element identification data previously stored in the cache of the coordinator device. Alternatively, the cached data retrieved in act 1210 may be the most-recently cached data at the coordinator device.

In act 1212, the application running on the mobile device highlights the representation of the first assignable controller within the mobile device application based on the received cached data. For example, the mobile device or another device in communication with the mobile device stores data associated with the representation of the first assignable controller displayed within the GUI of the application running on the mobile device. For example, the mobile device stores a device type and one or more button masks for each device displayed within the application, and the mobile device compares the received cached data to the data stored at the mobile device to identify which representation (e.g., which button representation within which device representation displayed within the GUI of the application running on the mobile device) to highlight.

The application running on the mobile device may highlight the identified representation within the application in any number of ways including. For example, the mobile device may highlight the identified representation within the application by increasing a brightness of (e.g., lighting up) the identified representation and/or changing a color of the identified representation. In one embodiment, the application running on the mobile device highlights the identified representation for a predetermined amount of time (e.g., one second, two seconds, or five seconds). In another embodiment, the application running on the mobile device highlights the identified representation until another representation within the application is to be highlighted (e.g., when another input element is activated).

The example shown in FIG. 12 illustrates acts 1202-1212 being repeated for the second assignable controller device. Acts 1202-1212 of the method 1200 may be repeated any number of times for any number of controller devices (e.g., assignable controller device) paired to the first wireless network. In one embodiment, acts 1202-1212 of the method 1200 are repeated each time an input element of a controller device paired with the coordinator device via the first wireless network is activated by user input. In another embodiment, acts 1202-1212 of the method 1200 are repeated each time an input element of an assignable controller device paired with the coordinator device via the first wireless network is activated by user input.

Figure 13:
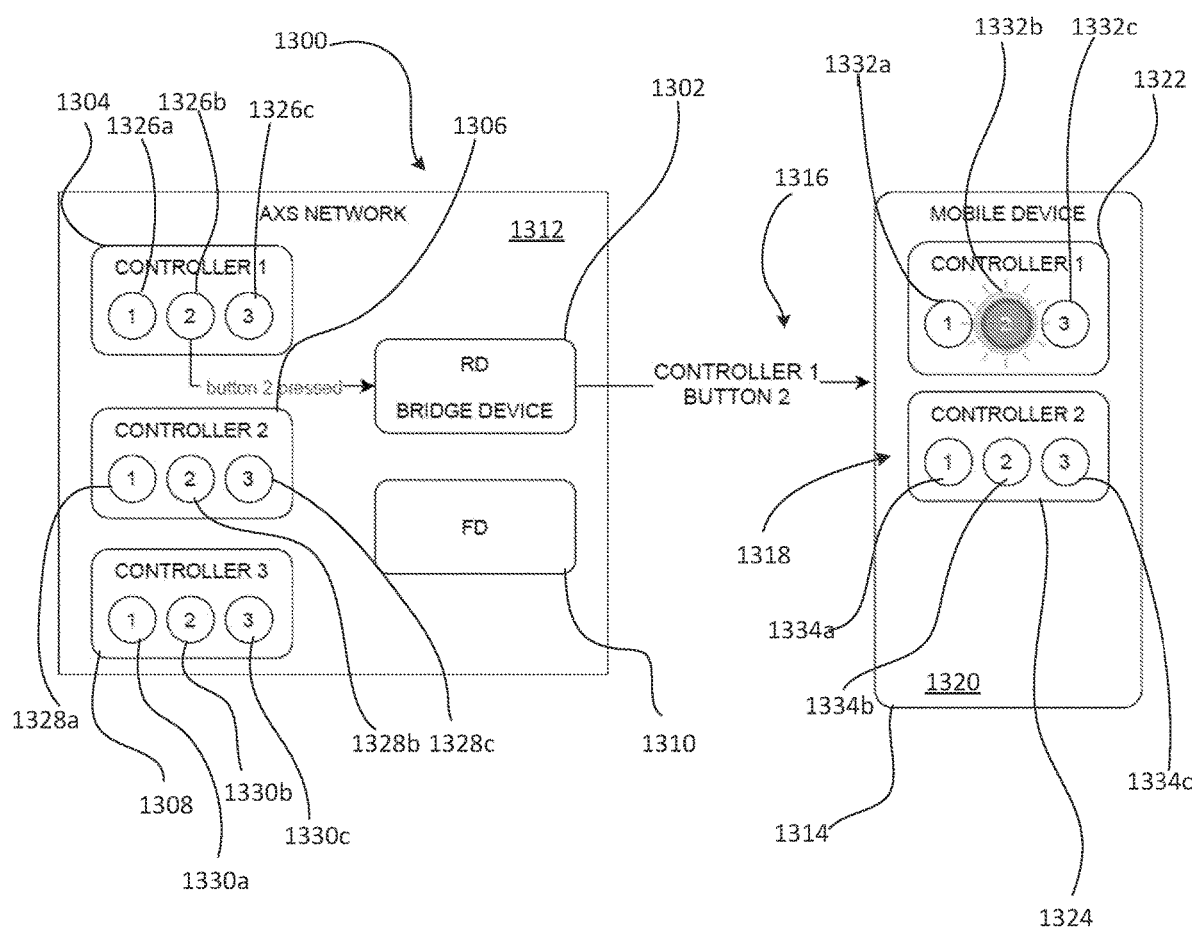
FIG. 13 is a visual representation of user experience for a method of indicating, within a mobile device application, which controller button has been pressed.

FIG. 13 is a visual representation of user experience for a method of indicating, within an application running on a mobile device, for example, which input element (e.g., button) of which controller device has been pressed. FIG. 13 illustrates a system 1300 of a bicycle (e.g., the bicycle 100) that includes a rear derailleur 1302 that acts as a coordinator device (e.g., a bridge device), a first controller device 1304, a second controller device 1306, a third controller device 1308, and a front derailleur 1310. The system 1300 may include more, fewer, and/or different components. For example, the system 1300 may include more or fewer controller devices.

The rear derailleur 1302, the first controller device 1304, the second controller device 1306, the third controller device 1308, and the front derailleur 1310, for example, are in communication with each other via a wireless network (e.g., a first wireless network 1312). In one embodiment, the first controller device 1304, the second controller device 1306, the third controller device 1308, and the front derailleur 1310 are paired to the rear derailleur 1302, as discussed above, to form the first wireless network 1312.

The rear derailleur 1302 acting as, for example, the coordinator device is in communication with a mobile device 1314 (e.g., a mobile phone) via the wireless network or another wireless network (e.g., a second wireless network 1316). The first wireless network 1312 and the second wireless network 1316 may be parts of an overall wireless network that operates with a same standard or protocol, or the first wireless network 1312 and the second wireless network 1316 may be different wireless networks that operate with different standards or protocols, respectively.

The mobile device 1314 is configured to run an application 1318 that includes a GUI 1320 displayed by the mobile device 1314. The application 1318 may facilitate (e.g., via the GUI 1320), for example, the configuration of components (e.g., the rear derailleur 1302 and the front derailleur 1310) of the system 1300 of the bicycle and/or the modification of assignments (e.g., the default set of assignments). The application 1318 may provide additional and/or different functionality.

The GUI 1320 displayed within the application 1318 includes representations of at least assignable controller devices (e.g., the first controller device 1304 and the second controller device 1306) paired with the coordinator device (e.g., the rear derailleur 1302) within the first wireless network 1312. In one embodiment, the GUI 1320 displayed within the application 1318 includes representations of all components of the system 1300 (e.g., all components paired to the rear derailleur 1302 within the first wireless network 1312). Representations for the unique components of the system 1300 (e.g., the rear derailleur 1302, the third controller device 1308, and the front derailleur 1310) may have unique representations (not shown) displayed within the GUI 1320 of the application 1318, respectively. Such unique components of the system 1300 may be identifiable by the corresponding representations within the GUI 1320. Assignable controller devices (e.g., the first controller device 1304 and the second controller device 1306) that are a same type of controller device (e.g., identical controller devices; single button controller devices, two-button controller devices, or three-button controller devices) may not be identifiable by corresponding representations within the GUI 1320, respectively. In other words, for example, a representation 1322 of the first assignable controller device 1304 and a representation 1324 of the second controller device 1306 displayed within the GUI 1320 of the application 1318 running on the mobile device 1314 may be the same.

In the example shown in FIG. 13, the first controller device 1304 includes three input elements 1326a-c (e.g., buttons), the second controller device 1306 includes three input elements 1328a-c (e.g., buttons), and the third controller device 1308 includes three input elements 1330a-c (e.g., buttons). The representation 1322 of the first assignable controller device 1304 may correspondingly include three representations 1332a-c of input elements, and the representation 1324 of the second controller device 1306 may correspondingly include three representations 1334a-c of input elements. The first controller device 1304 and the second controller device 1306, and the corresponding controller device representations 1322, 1324, may include more or fewer input elements.

As illustrated by the example of FIG. 13, when a second input element 1326b (e.g., button 2) of the first controller device 1304 is pressed by a user, the first controller device 1304 transmits data identifying which button on which controller was pressed (e.g., a device type code and a button mask; button identification data) to the coordinator device (e.g., a bridge device such as the rear derailleur 1302). As discussed above with reference to FIG. 12, the coordinator device 1302 ultimately transmits the button identification data to the mobile device 1314 running the application 1318. The mobile device 1314 identifies which input element representation (e.g., representation 1332a, 1332b, 1332c, 1334a, 1334b, or 1334c) of which controller device representation (e.g., representation 1322 or 1324) within the GUI 1320 of the application 1318 running on the mobile device 1314 corresponds to the received button identification data, and mobile device 1314 highlights the identified representation (e.g., representation 1332b) within the GUI 1320 of the application 1318. For example, the mobile device matches the received button identification data with data corresponding to a representation (e.g., the representation 1332b) within the GUI 1320 of the application 1318. Through this process, the user is able to easily identify identical components (e.g., identical shifters) without having to guess which controller device corresponds to which representation within the GUI 1320 of the application 1318.

Aspects of the embodiments engage in computer processing, for example, to receive and transmit wireless signals and to determine how to respond to such signals. For example, the network coordinator device 306 may include one or more processors 306d configured to execute program instructions stored on computer-readable media 306e, which when executed cause the one or more processors 306d to: (i) establish, via the first communication interface 306c, a pairing session that allows the controller devices 302 and the operation-enacting devices 304 to be paired to a wireless network 308, and (ii) transmit to the operation-enacting devices 304, via the first communication interface 306c, a roster 310 identifying the controller devices 302 and the operation-enacting devices 304 paired to the wireless network 308.

As another example, an operation-enacting device 304 may include one or more processors 304c configured to execute program instructions stored on computer-readable media 304d, the program instructions causing the one or more processors 306d to process the default set of assignments 312 based on the roster 310, where the default set of assignments 312 indicates which of the controller devices 302 is selected to cause the operation-enacting device 304 to respond by modifying the operative state of the bicycle. Additionally, the one or more processors 304c of the operation-enacting devices 304 receive, via the communication interface 304a, a modified set of assignments 312' from the network coordinator device 306, where the modified set of assignments 312' causes the operation-enacting device 304 to modify the operative state of the bicycle in response to the signals 302b from a different one of the controller devices; the program instructions cause the one or more processors 304c to replace the default or current set of assignments 312 with the modified set of assignments 312'.

The one or more processors 302e, 304c, 306d employed by the embodiments may include a general processor, digital signal processor, an application specific integrated circuit (ASIC), field programmable gate array (FPGA), analog circuit, digital circuit, combinations thereof, or other now known or later developed processor. The processor may be a single device or combinations of devices, such as through shared or parallel processing.

Aspects of the embodiments may also employ computer memory. Such memory may be a volatile memory or a non-volatile memory. The memory may include one or more of a read only memory (ROM), random access memory (RAM), a flash memory, an electronic erasable program read only memory (EEPROM), or other type of memory. The memory may be removable from the corresponding device, such as a secure digital (SD) memory card. Computer memory includes any one or more of a computer-readable medium and other equivalents and successor media, in which data or instructions may be stored. In general, a computer-readable medium includes any medium that is capable of storing, encoding, or carrying a set of instructions for execution by a processor or that cause a computer system to perform any one or more of the methods or operations disclosed herein.

To power wireless communications and computer processing, embodiments employ power supplies, which may be stored internal to the operating device, or stored external to the operating device. The power supply may include a combination of multiple batteries or other power providing devices. Specially fitted or configured battery types, or standard battery types such as CR 2012, CR 2016, and/or CR 2032 may be used. In some embodiments, the devices in a system are all individually powered (e.g., by a dedicated battery).

As described above, the embodiments employ communication interfaces. Such communication interfaces are configured to send data such as control signals and/or commands to bicycle components. In particular, the communication interface provides for wireless communications in any now known or later developed format. Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

It is understood that the illustration or other representation of devices, such as the network coordinator devices, the controller devices, and the operation-enacting devices, include (even if not expressly labeled) any combination of processor(s), memory device(s) (e.g., computer-readable media storing program instructions for execution by processor(s)), communication interface(s), and power supply necessary to achieve the disclosed features.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Although some of the acts and/or functions described in this disclosure have been described as being performed by a particular entity, the acts and/or functions can be performed by any entity, such as those entities described in this disclosure. Further, although the acts and/or functions have been recited in a particular order, the acts and/or functions need not be performed in the order recited. However, in some instances, it can be desired to perform the acts and/or functions in the order recited. Further, each of the acts and/or functions can be performed responsive to one or more of the other acts and/or functions. Also, not all of the acts and/or functions need to be performed to achieve one or more of the benefits provided by this disclosure, and therefore not all of the acts and/or functions are required In certain circumstances, multitasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A system for a bicycle, the system comprising:
   a plurality of controller devices, a type of controller device being the same for two or more controller devices of the plurality of controller devices;
   a pairing coordinator device configured to:
      receive a device type identification from each controller device of the plurality of controller devices;
      identify the type of controller device for the two or more controller devices based on the device type identifications received for the two or more controller devices, respectively;
      based on the identification of the type of controller device, update the device type identifications for the two or more controller devices, respectively, such that updated device type identifications for the two or more controller devices are different than each other; and
      pair only controller devices of the plurality of controller devices having different device type identifications with the pairing coordinator device, such that a wireless network that enables communications between the pairing coordinator device and the controller devices is established.

2. The system of claim 1, further comprising one or more movable components, each movable component of the one or more movable components being configured to enact at least one respective operation on the bicycle, wherein the pairing coordinator device is further configured to:
   receive a device type identification from each moveable component of the one or more movable components; and
   pair the one or more movable components to the wireless network, such that the wireless network enables communications between the pairing coordinator device, the controller devices, and the one or more movable components.

3. The system of claim 2, wherein the pairing coordinator device is further configured to generate a roster and transmit the roster to the one or more movable components via the wireless network, the roster identifying the controller devices and the one or more movable components paired to the wireless network.

4. The system of claim 3, wherein each controller device of the plurality of controller devices includes at least one respective input element, wherein the paired controller devices are configured to transmit signals indicating input received by the input elements of the paired controller devices, respectively, and wherein the one or more movable components are configured to identify, based on the roster received from the pairing coordinator device, operations to be executed, respectively, in response to the signals received from the paired controller devices.

5. The system of claim 4, wherein the paired one or more movable components are configured to determine which of the one or more movable components are to execute which of the operations responsive to the signals, the determination of which of the one or more movable components are to execute which of the operations responsive to the signals comprising process of a default set of assignments.

6. The system of claim 5, wherein a movable component of the paired one or more movable components is further configured to:
   receive, via the wireless network, the signals from the paired controller devices; identify one of the received signals as being from an assigned controller device of the paired controller devices according to the default set of assignments; and
   enact the respective operation in response to the one received signal from the assigned controller device.

7. The system of claim 6, wherein the pairing coordinator device includes a communication interface configured to receive a modified set of assignments, the modified set of assignments causing at least one of the operations to be enacted by a corresponding movable component of the one or more movable components in response to one or more of the signals from a different one of the controller devices compared to the default set of assignments, wherein the pairing coordinator device is configured to transmit, via the wireless network, the modified set of assignments to the one or more movable components, and wherein the one or more movable components are configured to:
   replace the default set of assignments with the modified set of assignments; and
   determine how the one or more movable devices enact the operations responsive to the signals according to the modified set of assignments.

8. The system of claim 2, wherein the pairing coordinator device is a movable component of the one or more movable components.

9. The system of claim 8, wherein the one or more movable components include a front derailleur configured to modify a position of a bicycle chain of the bicycle relative to a first set of gears of the bicycle, a rear derailleur configured to modify a position of the bicycle chain relative to a second set of gears of the bicycle, a seat post assembly configured to modify a position of a seat of the bicycle relative to a frame of the bicycle, or any combination thereof.

10. The system of claim 1, wherein the device type identifications are updated based on a temporal order in which the device type identifications are received by the pairing coordinator from the two or more controller devices.

11. The system of claim 1, wherein the identification of the type of controller device for the two or more controller devices comprises:
   comparison of the device type identifications received for the two or more controller devices to a predetermined device type identification or a predetermined device type identification range, respectively; and
   identification of the type of controller device when the device type identifications received for the two or more controller devices are the same as the predetermined device type identification or within the predetermined device identification range.

12. The system of claim 11, wherein the device type identifications have numerical values, the predetermined device type identification has a numerical value, and the predetermined device type identification range represents a range of numerical values.

13. The system of claim 1, wherein the type of controller device is a first type of controller device, and wherein the plurality of controller devices include two or more second controller devices, the two or more second controller devices being a second type of controller device, the second type of controller device being different than the first type of controller device.

14. The system of claim 13, wherein the first type of controller device is one of an assignable single button controller and an assignable two button controller, and the second type of controller device is the other of the assignable single button controller and the assignable two button controller.

15. The system of claim 13, wherein the pairing coordinator device is further configured to:
   receive a device type identification from each second controller device of the plurality of second controller devices;
   identify the second type of controller device for the plurality of second controller devices based on the device type identifications received from the plurality of second controller devices;
   based on the identification of the second type of controller device, update the device type identifications for the plurality of second controller devices, respectively, such that the updated device type identifications for the plurality of second controller devices are different than each other; and
   pair only second controller devices having different respective device type identifications, respectively, to the wireless network, such that the wireless network enables communications between the pairing coordinator device, the first controller devices, and the second controller devices.

16. The system of claim 1, wherein the update of the device type identifications for the two or more controller devices comprises storage of the updated device type identifications at the two or more controller devices, respectively.

17. A pairing coordinator device for a bicycle, the pairing coordinator device comprising:
   a communication interface configured to communicate with a plurality of controller devices, a type of controller device being the same for two or more controller devices of the plurality of controller devices, the communication interface being configured to receive a device type identification from each controller device of the plurality of controller devices;
   one or more processors in communication with the communication interface, the one or more processors being configured to:
      establish, via the communication interface, a pairing session that allows the plurality of controller devices to be paired to a wireless network, the establishment of the pairing session comprising:
         identification of the type of controller device for the two or more controller devices based on the device type identifications received for the two or more controller devices, respectively;
         based on the identification of the type of controller device, update of the device type identifications for the two or more controller devices, respectively, such that updated device type identifications for the two or more controller devices are different than each other; and
         pair of only controller devices of the plurality of controller devices having different device type identifications with the pairing coordinator device, such that the wireless network, which enables communications between at least the pairing coordinator device and the controller devices, is established.

18. The pairing coordinator device of claim 17, wherein the device type identifications are updated based on a temporal order in which the device type identifications are received by the pairing coordinator from the two or more controller devices.

19. The pairing coordinator device of claim 18, wherein the pairing session is a first pairing session, the wireless network is a first wireless network, the temporal order is a first temporal order, and the updated device type identifications are first updated device type identifications, and wherein the one or more processors are further configured to:
    establish, via the communication interface, a second pairing session that allows the plurality of controller devices to be paired to a second wireless network, the establishment of the second pairing session being after the establishment of the first pairing session, the establishment of the second pairing session comprising:
    receipt, via the communication interface, of a device type identification from each controller device of the plurality of controller devices in a second temporal order, the second temporal order being different than the first temporal order;
    identification of the type of controller device for the two or more controller devices based on the device type identifications received for the two or more controller devices, respectively;
    based on the identification of the type of controller device, update of the first updated device type identifications for the two or more controller devices, respectively, such that second updated device type identifications are generated for the two or more controller devices, respectively, the second updated device type identifications being different than the first updated device type identifications; and
    pair of only controller devices of the plurality of controller devices having different respective device type identifications with the pairing coordinator device, such that the second wireless network, which enables communications between at least the pairing coordinator device and the controller devices, is established.

* * * * *